US010054807B2

(12) United States Patent
Hirabayashi

(10) Patent No.: US 10,054,807 B2
(45) Date of Patent: Aug. 21, 2018

(54) ELECTRO-OPTICAL MODULE AND PROJECTION-TYPE DISPLAY APPARATUS

(71) Applicant: Seiko Epson Corporation, Tokyo (JP)

(72) Inventor: Hidekazu Hirabayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 932 days.

(21) Appl. No.: 14/537,251

(22) Filed: Nov. 10, 2014

(65) Prior Publication Data

US 2015/0153611 A1 Jun. 4, 2015

(30) Foreign Application Priority Data

Nov. 29, 2013 (JP) ................................ 2013-247380

(51) Int. Cl.
*G02F 1/1333* (2006.01)
*H04N 5/74* (2006.01)
*H04N 9/31* (2006.01)

(52) U.S. Cl.
CPC ..... *G02F 1/133308* (2013.01); *H04N 5/7441* (2013.01); *H04N 9/3105* (2013.01); *H04N 9/3141* (2013.01); *H04N 9/3144* (2013.01); *G02F 2001/133317* (2013.01)

(58) Field of Classification Search
CPC ......... G02F 1/133308; G02F 1/133608; G02F 2001/133317; H04N 5/7441; H04N 9/3141; H04N 9/3144; H04N 9/3105
USPC .......................................................... 349/58
See application file for complete search history.

(56) References Cited

U.S. PATENT DOCUMENTS

| 5,835,179 | A | 11/1998 | Yamanaka |
| 6,069,677 | A | 5/2000 | Kitai |
| 6,414,781 | B1 | 7/2002 | Saitoh |
| 2002/0131141 | A1 | 9/2002 | Saitoh |
| 2006/0001821 | A1 | 1/2006 | Dewa et al. |
| 2013/0077058 | A1* | 3/2013 | Miyashita ............ H04N 9/3105 353/52 |
| 2013/0083268 | A1 | 4/2013 | Hirabayashi |

FOREIGN PATENT DOCUMENTS

| JP | 10-123964 A | 5/1998 |
| JP | 10-232629 A | 9/1998 |
| JP | 2000-347168 A | 12/2000 |
| JP | 2004-279700 A | 10/2004 |
| JP | 2005-196027 A | 7/2005 |
| JP | 2006-18055 A | 1/2006 |
| JP | 2006-276623 A | 10/2006 |
| JP | 4179239 B | 11/2008 |
| JP | 4613663 B | 1/2011 |

(Continued)

*Primary Examiner* — Nathanael R Briggs
*Assistant Examiner* — William Peterson
(74) *Attorney, Agent, or Firm* — ALG Intellectual Property, LLC

(57) ABSTRACT

In an electro-optical module, a first transparent plate is provided on a second surface of a first substrate of an electro-optical panel. A size of the first transparent plate is smaller than that of the first substrate, and the first substrate includes a protrusion surface protruding from the first transparent plate. In the frame made of metal that accommodates the electro-optical panel and the first transparent plate therein, corner portions bent along the protrusion surface of the first substrate and the side surfaces of the first transparent plate is provided.

19 Claims, 14 Drawing Sheets

(56) References Cited

FOREIGN PATENT DOCUMENTS

| JP | 2013-068873 A | 4/2013 |
| JP | 2013-073184 A | 4/2013 |
| JP | 2013-073185 A | 4/2013 |

* cited by examiner

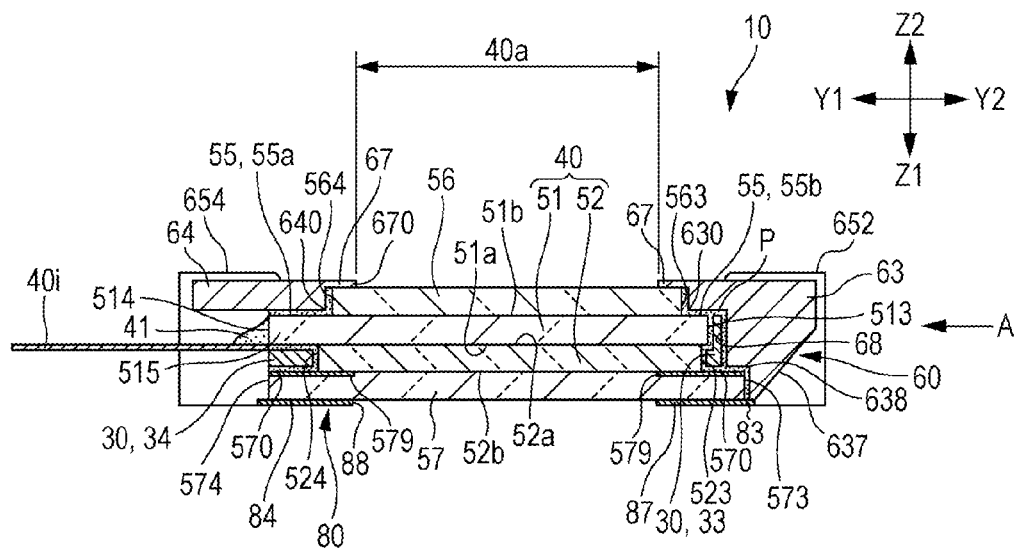
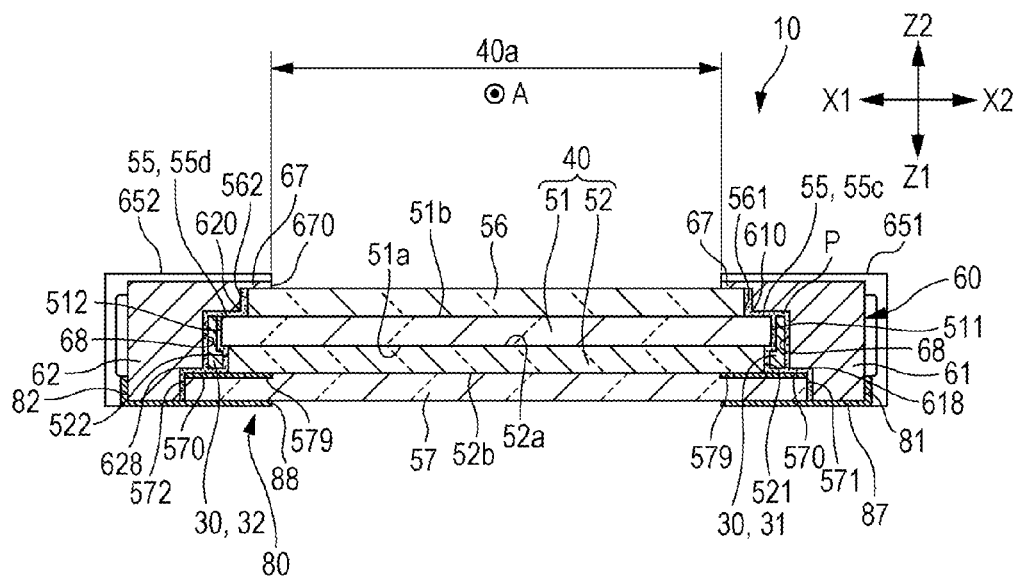

ELECTRO-OPTICAL MODULE AND PROJECTION-TYPE DISPLAY APPARATUS

BACKGROUND

1. Technical Field

The present invention relates to an electro-optical module used in an electronic apparatus such as a projection-type display apparatus, and the projection-type display apparatus that includes the electro-optical module.

2. Related Art

When an image is displayed in an electronic apparatus such as a projection-type display apparatus, a light is used which is modulated by a electro-optical panel such as a liquid crystal panel. The electro-optical panel has a configuration in which, for example, an electro-optical material layer such as a liquid crystal layer is provided between a first substrate and a second substrate, and on the outer side surface of the first substrate and the second substrate, a first transparent plate and a second transparent plate are adhered for the purpose of dust control.

In the electro-optical panel in such a configuration, when the temperature of the electro-optical panel increases due to the heat generated in the electro-optical panel itself or an incidence of a source light, a deterioration in the electro-optical material layer occurs. Therefore, a structure is proposed, in which, when the electro-optical panel is mounted on the electronic apparatus as an electro-optical module, the electro-optical panel is accommodated inside of a metal-made first frame body, and by a second frame body made of metal engaged with the first frame body, the first frame body is integrated with a metal-made third frame body which is disposed so as to overlap the protrusion surface from the first transparent plate of the electro-optical panel and the side surface of the first transparent plate, and then, the heat in the electro-optical panel is released via those frame bodies (see FIG. 5 to FIG. 11 in JP-A-2004-279700).

However, as in the configuration disclosed in FIG. 5 to FIG. 11 of JP-A-2004-279700, in the complicated configuration in which three frame bodies are used for holding the emitting side in the electro-optical panel, the number of components is large and time is consumed for assembly. Therefore, there is a problem in that the cost increases.

SUMMARY

An advantage of some aspects of the invention is to provide an electro-optical module having a simple configuration, in which the heat of the electro-optical panel can be released with a high efficiency, and a projection-type display apparatus that includes the electro-optical module.

An electro-optical module according to an aspect of the invention includes: an electro-optical panel that includes a first substrate, a second substrate which is disposed so as to face the first substrate and an electro-optical material layer which is provided between the first substrate and second substrate, a first transparent plate that overlaps at least an image display area of the electro-optical panel on the side of the first substrate on the opposite side of the second substrate, a second transparent plate that overlaps the image display area on the surface of the second substrate on the opposite side to the first substrate, and a frame that includes a corner portion bent along the protrusion surface protruding from a side surface of the first transparent plate and the first transparent plate of the first substrate, and that accommodates the first transparent plate and the electro-optical panel. The first substrate includes a protrusion portion which protrudes from an end portion of the second substrate and to which a flexible wiring board is connected. Among the protrusion surfaces of the first substrate, an overlapping width of the first protrusion surface on the protrusion portion side with the frame is larger than that of a second protrusion surface which is positioned on the side opposite to the first protrusion surface across the first transparent plate. An overlapping width of the second protrusion surface with the frame is larger than that of a third protrusion surface which is positioned between the first protrusion surface and the second protrusion surface.

In this case, since the first transparent plate and the second transparent plate are provided so as to overlap the image display area, dust does not adhere on the position near the electro-optical material layer. Therefore, even in a case where the image generated by the electro-optical panel is projected, the influence of dust hardly affects the image. Here, the electro-optical panel is accommodated inside of the frame, and in the frame, corner portions are formed, which are bent along the protrusion surface protruding from the side surface of the first transparent plate and the first transparent plate of the first substrate. For this reason, it is possible to release the heat generated by the electro-optical panel to the frame from the first substrate and the first transparent plate with a high efficiency. Therefore, it is possible to suppress the deterioration of the electro-optical material layer caused by the increase of the temperature of the electro-optical panel. In addition, the first substrate and the electro-optical panel can be accommodated inside of one frame, and a position determination of the first substrate and the electro-optical panel can be performed by the corner portions formed on the wall portion. Therefore, according to the invention, with a simple configuration, it is possible to release the heat of the electro-optical panel with a high efficiency, and it is possible to achieve a high efficiency in the assembly process. In addition, since the side where the protrusion portion to which the flexible wiring board is connected is positioned is surrounded by the air layer, it is difficult for the heat to be dissipated, and even in a case where cooling air is supplied to the electro-optical module, since the side where the protrusion portion to which the flexible wiring board is connected is positioned becomes a downwind side, the cooling effect is small. However, in the invention, by increasing an overlapping width on the first protrusion surface of the side where the protrusion portion is positioned and the frame being large, the dissipation on the side where the protrusion side is positioned is increased. Therefore, it is possible to suppress the increase of the temperature on the side where the protrusion portion is positioned. In addition, in a case where the cooling air is supplied to the electro-optical module, since a side opposite to the side where the protrusion portion to which the flexible wiring board is connected is positioned becomes a windward side, and the overlapping width of the second protrusion surface of the first substrate and the frame on the windward side is larger than the overlapping width of the third protrusion surface positioned between the first protrusion surface and the second protrusion surface and the frame, the efficiency of the heat dissipation increases. Therefore, it is possible to assure the sufficient heat dissipation in view of the whole electro-optical panel. Therefore, it is possible to decrease the width of the electro-optical module by as much as the decreased overlapping width of the third protrusion surface and the frame.

It is preferable to adopt a configuration in which a size of the first transparent plate is smaller than that of the first substrate, and the protrusion surface and the corner portion are formed so as to surround the entire circumference of the first transparent plate.

It is preferable that the frame include a plate-shaped light shielding portion for forming a border, which overlaps a surface of the first transparent plate to the opposite side of the first substrate. According to the configuration, it is not necessary to dispose a light shielding plate on the first transparent plate side.

It is preferable that a light shielding layer for forming a border be provided on the surface of the first transparent plate on the electro-optical panel side, and on a side of the first substrate where the first transparent plate is positioned, an end portion of the frame and a surface of the first transparent plate to the opposite side of the first substrate be positioned in the same plane. According to the configuration, it is not necessary to dispose a light shielding plate on the first transparent plate side. For this reason, on the side where the first substrate is positioned, the end portion of the frame and a surface of the first transparent plate to the side where the first substrate is positioned are positioned in the same plane. Accordingly, when cooling air is supplied to the electro-optical module, the cooling air smoothly flows on the surface of the first transparent plate. Therefore, the cooling effect is high.

It is preferable that an adhesive be interposed between the protrusion surface of the first substrate and the frame. According to the configuration, it is possible to increase the effect of the heat dissipation from the first substrate to the frame compared to a case where an air layer is interposed between the first substrate and the frame.

It is preferable to adopt a configuration in which the electro-optical module further includes a light shielding plate for forming a border that is coupled to the frame while overlapping the surface of the second transparent plate to the opposite side of the electro-optical panel.

It is preferable to adopt a configuration in which a light shielding layer for forming a border is provided on the surface of the second transparent plate on the electro-optical panel side, and on a side of the second substrate where the second transparent plate is positioned, the end portion of the frame and a surface of the second transparent plate to the opposite side of the second substrate are positioned in the same plane. According to the configuration, it is not necessary to dispose a light shielding plate on the second substrate side. For this reason, on the side where the second substrate is positioned, the end portion of the frame and a surface of the second transparent plate to the side where the second substrate is positioned are positioned in the same plane. Accordingly, when the cooling air is supplied to the electro-optical module, the cooling air smoothly flows on the surface of the second transparent plate. Therefore, the cooling effect is high.

It is preferable that the first substrate be an element substrate that includes a pixel electrode and a switching element provided corresponding to the pixel electrode. According to the configuration, it is possible to release the heat generated on the first substrate to the frame with a high efficiency.

In this case, the electro-optical panel is, for example, a liquid crystal panel that includes a liquid crystal layer as an electro-optical material layer.

It is effective that the invention be applied to a case where the electro-optical module is used in a projection-type display apparatus. The projection-type display apparatus includes a light source portion that emits light which is supplied to the electro-optical module, and a projection optical system in which the light modulated by the electro-optical module is projected. In a case of the projection-type display apparatus, a strong light from the light source is incident on the electro-optical panel. However, according to an aspect of the invention, it is possible to suppress the increase of the temperature of the electro-optical panel.

It is preferable that the projection-type display apparatus include a cooling device that supplies cooling air to the electro-optical module. According to the configuration, it is possible to suppress the increase of the temperature of the electro-optical panel.

BRIEF DESCRIPTION OF THE DRAWINGS

The invention will be described with reference to the accompanying drawings, wherein like numbers reference like elements.

FIG. 14A and FIG. 14B are cross-sectional views of an electro-optical module in Embodiment 5 of the invention.

DESCRIPTION OF EXEMPLARY EMBODIMENTS

Figure 1A:
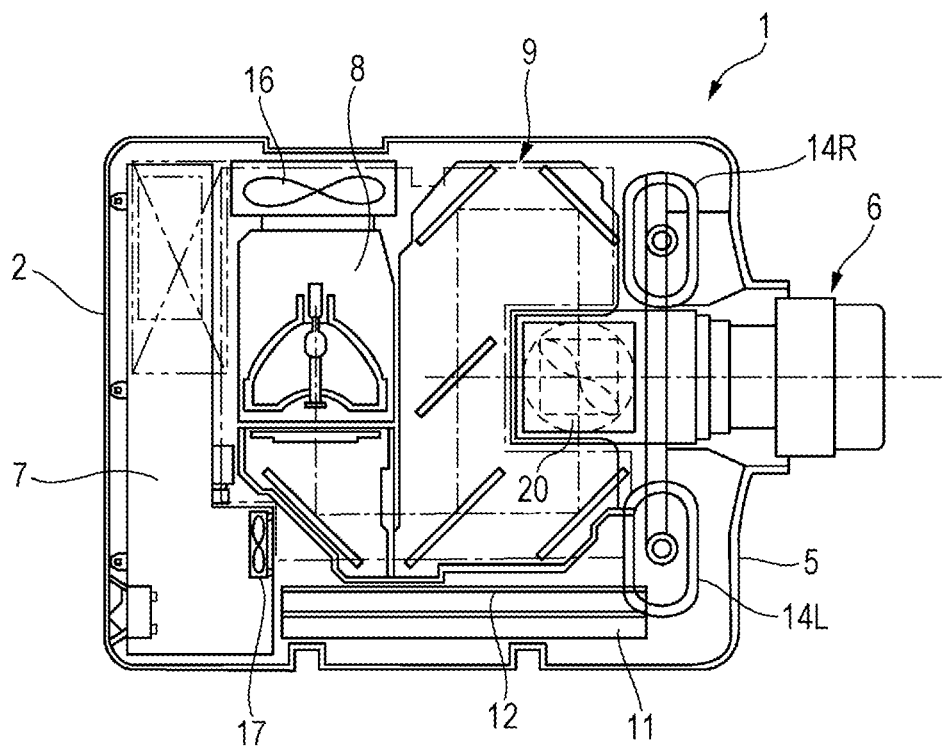
FIG. 1A and FIG. 1B are explanatory drawings of a projection-type display apparatus as an example of an electronic apparatus to which the invention is applied.

Embodiments of the invention will be described with reference to the drawings. In the description, as an electronic apparatus to which the invention is applied, a projection-type display apparatus in which an electro-optical module that includes a transmission-type electro-optical panel (a transmission-type liquid crystal panel) is used as a light bulb will be described. In addition, in the reference drawings for the description hereafter, in order to make sizes of each layer and each member in the drawings recognizable, the scale of each layer or each member is made to be different.

Embodiment 1

Overview of Projection-type Display Apparatus (An Electronic Apparatus)

Figure 1B:
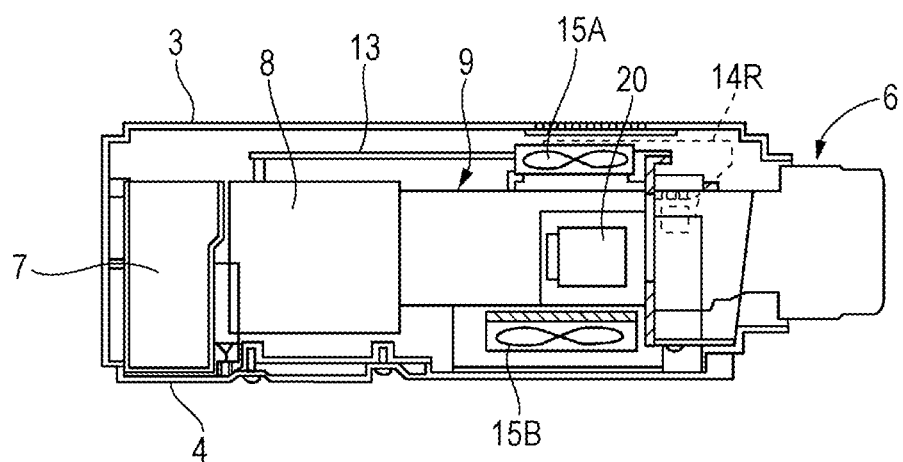
Figure 2:
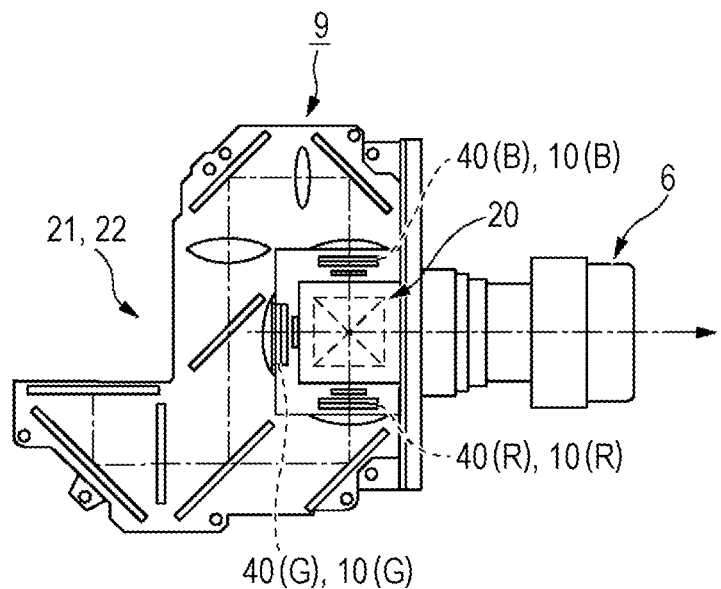
FIG. 2 is an explanatory drawing illustrating a configuration of an optical unit used in the projection-type display apparatus to which the invention is applied.

FIG. 1A and FIG. 1B are explanatory drawings of a projection-type display apparatus as an example of an electronic apparatus to which the invention is applied. FIG. 1A is an explanatory drawing illustrating a planar configuration of a main portion of the projection-type display apparatus, and FIG. 1B is an explanatory drawing illustrating the main portion seen from the side. FIG. 2 is an explanatory drawing illustrating a configuration of an optical unit used in the projection-type display apparatus to which the invention is applied.

In a projection-type display apparatus 1 illustrated in FIG. 1A and FIG. 1B, in outer cases 2 and 5, a power source unit 7 is disposed at the rear side thereof, and a light source lamp unit 8 (light source portion) and an optical unit 9 are disposed at the position adjacent to the power source unit 7 in the front side of the device. In addition, inside of the outer case 2, at the center of the front side of the optical unit 9, a base end side of a projection lens unit 6 is positioned. At one side of the optical unit 9, an interface substrate 11 on which an input-output interface circuit is mounted is disposed toward a front/rear direction of the apparatus, and a video substrate 12 on which a video signal processing circuit is mounted is disposed in a direction parallel to the interface substrate 11. At the upper side of the light source lamp unit 8 and the optical unit 9, a control substrate 13 for device drive controlling is disposed, and at each of the right and left corners of a front end side of the device, speakers 14R and 14L are disposed.

Above and below the optical unit 9, air intake fans 15A and 15B for cooling the inside of the device are disposed. In addition, at the side surface of the device which is the rear surface side of the light source lamp unit 8, an exhaust fan 16 is disposed. Furthermore, at a position opposing the end of the interface substrate 11 and the video substrate 12, an auxiliary cooling fan 17 for sucking the cooling air flow from the air intake fan 15A into the power source unit 7 is disposed. Among those fans, the air intake fan 15B functions as a cooling fan (a cooling device) with respect to an electro-optical panel 40 described below.

In FIG. 2, each optical element (element) that configures the optical unit 9 includes a prism unit 20 that configures color-light combining means and is supported by an upper light guide 21 or a lower light guide 22 made from metal such as magnesium or aluminum. The upper light guide 21 and the lower light guide 22 are fixed to an upper case 3 and a lower case 4 by fixing screws.

Detailed Configuration of Optical Unit 9

Figure 3:
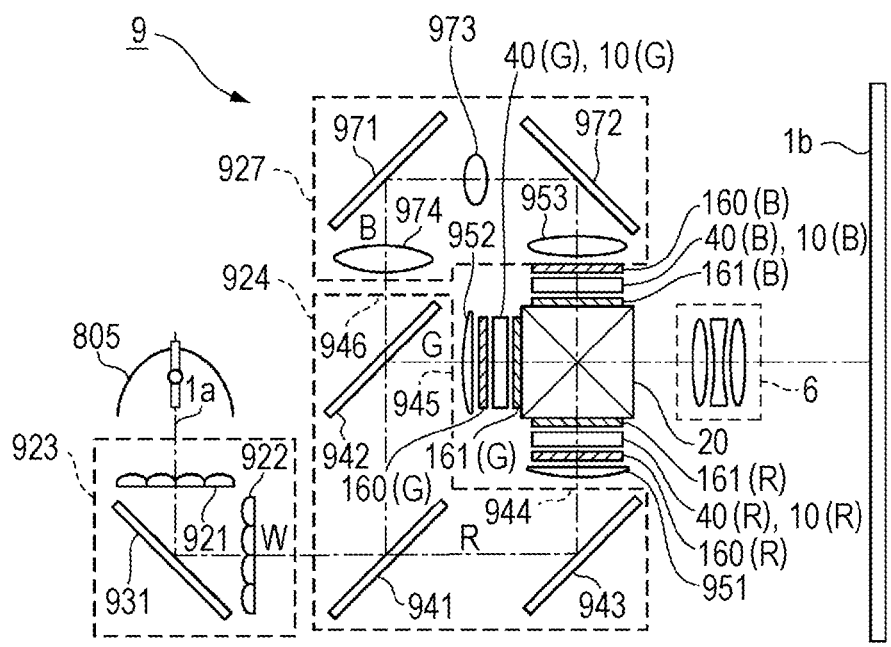
FIG. 3 is an explanatory drawing illustrating a detailed configuration of the electro-optical unit used in the projection-type display apparatus to which the invention is applied.

FIG. 3 is an explanatory drawing illustrating a detailed configuration of the electro-optical unit used in the projection-type display apparatus to which the invention is applied. As illustrated in FIG. 3, The optical unit 9 includes a light source lamp 805, an illumination optical system 923 that includes integrator lenses 921 and 922 which are uniform illumination optical elements, and a color light separation optical system 924 that separates a light flux W emitted from the illumination optical system 923 into each of the three colors of red, green, and blue light fluxes R, G, and B. In addition, the optical unit 9 includes three transmission-type electro-optical panels 40(R), 40(G), and 40(B) as electro-optical panels (light bulbs) that modulate each color light flux, the prism unit 20 as a color light synthesis optical system that synthesizes the modulated color light, and the projection lens unit 6 that enlarges and projects the synthesized light flux on a projection surface. In addition, the optical unit 9 includes a relay optical system 927 that performs guide to the electro-optical panel (40) corresponding to the blue light flux B among each of the color light fluxes separated by the color light separation optical system 924.

The illumination optical system 923 further includes a reflection mirror 931 to cause a light axis 1a of the light emitted from the light source lamp 805 to bend to a direction perpendicular to the front direction of the device. The integrator lenses 921 and 922 are disposed in a state of being perpendicular to the front/rear of each other with the reflection mirror 931 interposed therebetween.

The color light separation optical system 924 is configured to include a blue-green reflection dichroic mirror 941, a green reflection dichroic mirror 942, and a reflection mirror 943. First, in the blue-green reflection dichroic mirror 941, from the light flux W passing through the illumination optical system 923, the blue light flux B and the green light flux G included therein are orthogonally reflected and travel toward the green reflection dichroic mirror 942 side. The red light flux R passes through the blue-green reflection dichroic mirror 941 and is perpendicularly reflected by the reflection mirror 943 at the rear side and emitted to the color light synthesis optical system side from a red light flux emitting portion 944. Next, in the green reflection dichroic mirror 942, among the blue and green light fluxes B and G reflected by the blue-green reflection dichroic mirror 941, only the green light flux G is orthogonally reflected and emitted to the color light synthesis optical system side from a green light flux emitting portion 945. The blue light flux B having passed through the green reflection dichroic mirror 942 is emitted to the relay optical system 927 side from the blue light flux emitting portion 946. In the present embodiment, all the distances from the light flux emitting portion of the illumination optical system 923 to each of the light flux emitting portions 944, 945, and 946 in the color light separation optical system 924 are set to be almost equal.

At the emitting side of the red light flux and green light flux emitting portions 944 and 945 in the color light separation optical system 924, condensing lenses 951 and 952 are disposed respectively. Therefore, the red light flux and the green light flux emitted from each emitting portion are incident on the condensing lenses 951 and 952 and parallelized.

Polarization directions of the parallelized red and green light fluxes R and G are aligned by polarizing plates 160(R) and 160(G), and then, are incident on the electro-optical panels 40(R) and 40(G), and are modulated for image information corresponding to each color light to be added. That is, the electro-optical panels 40(R) and 40(G) are switching controlled by an image signal corresponding to the image information by drive means (not illustrated), and thereby the modulation of each color light passing through the panels is performed. As the above-described drive means, well-known means can be used.

On the other hand, the blue light flux B passes through the relay optical system 927, and the polarization direction thereof is aligned by the polarizing plate 160(B), is guided to the corresponding electro-optical panel 40(B), and therein, similarly modulated according to the image information. The relay optical system 927 is configured to include a condensing lens 974, an incidence side reflection mirror 971, an emitting side reflection mirror 972, an intermediate lens 973 disposed between the above-described two mirrors, and a condensing lens 953 disposed at the front side of the electro-optical panel 40(B). In a length of light path of each color light flux, that is, a distance from the light source lamp 805 to each liquid crystal panel, the length of the light path of blue light flux B is the longest one. Therefore, an amount of optical loss of the blue light flux is the largest. However, the optical loss can be suppressed by interposing the relay optical system 927.

Each color light flux having passed through each electro-optical panel 40(R), 40(G), and 40(B) and modulated is respectively incident on each polarizing plate 161(R), 161 (G), and 161(B), and the light having passed the polarizing plates is incident on the prism unit 20 (cross dichroic prism) so as to be synthesized. The color image synthesized here is enlarged and projected on a projection surface 1b such as a screen located at a predetermined position via the projection lens unit 6 that includes the projection lens system.

Configuration of Electro-optical Panel 40

Figure 4A:
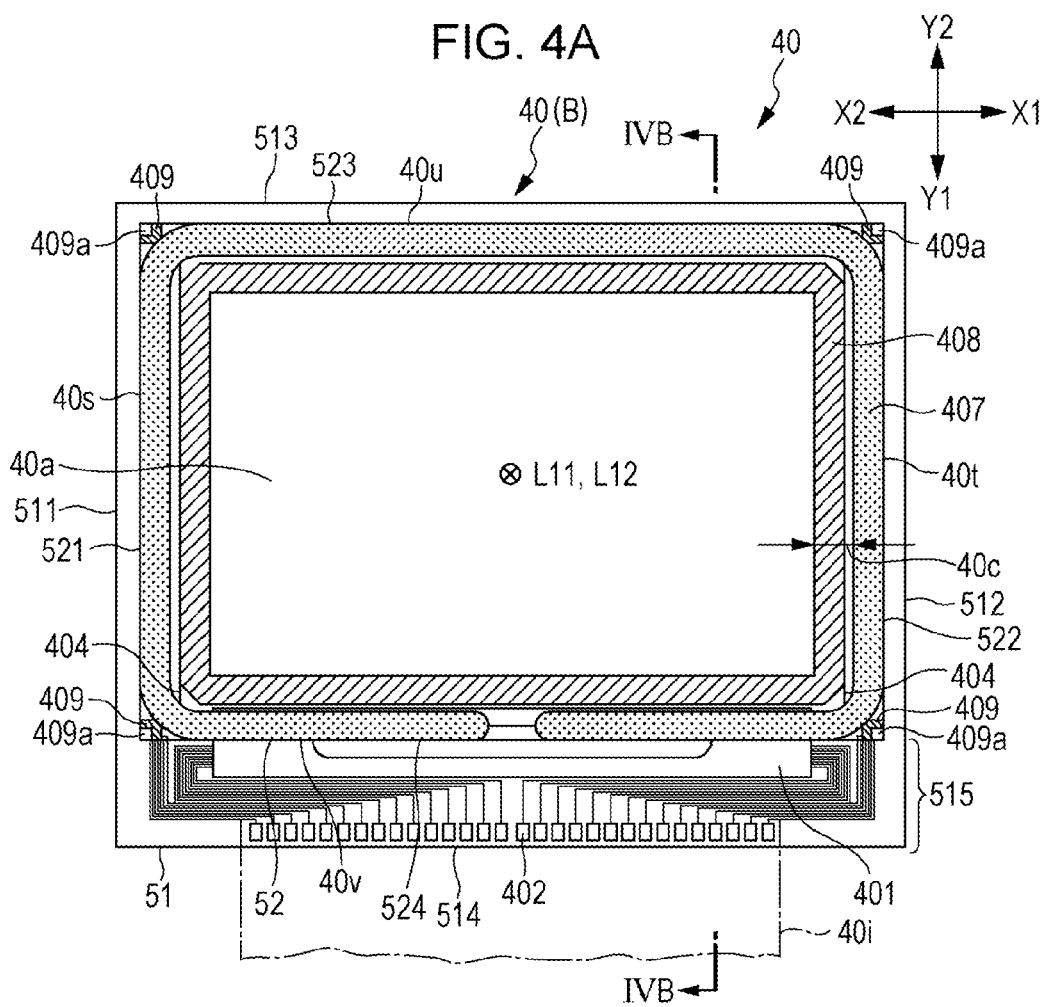
FIG. 4A and FIG. 4B are explanatory drawings of an electro-optical panel used in an electro-optical module to which the invention is applied.
Figure 4B:
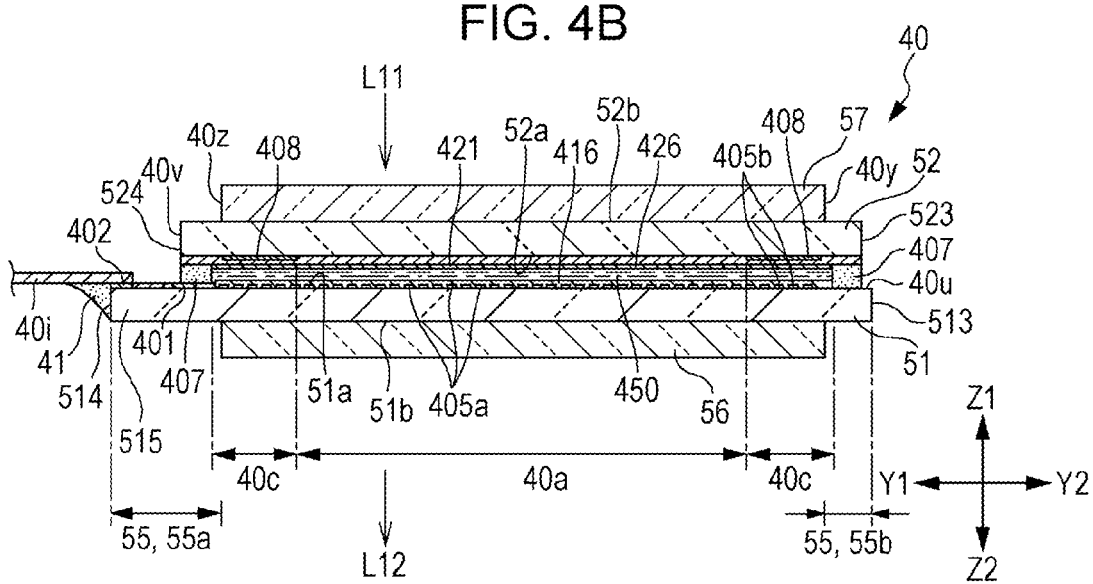

FIG. 4A and FIG. 4B are explanatory drawings of the electro-optical panel 40 used in the electro-optical module to which the invention is applied. FIG. 4A is a plan view seen from a second substrate side and illustrates each configuration component of the electro-optical panel 40. FIG. 4B is a cross-sectional view taken along the line IVB-IVB' and illustrates each configuration component of the electro-optical panel 40.

In FIG. 4A and FIG. 4B to subsequent FIG. 5 to FIG. 8, a traveling direction of the source light is illustrated by an arrow L11, a traveling direction of the display light in which the source light is modulated by the electro-optical panel 40 is illustrated by an arrow L12, and the cooling air (cooling gas) supplied to the electro-optical panel 40 by the air intake fan 15B illustrated in FIG. 1B is illustrated by an arrow A. In addition, in the description hereafter, one of the directions crossing each other in the plane direction of the electro-optical panel 40 and the electro-optical module 10 is assumed to be an X-axis direction and the other direction thereof is assumed to be a Y-axis direction, and the direction crossing the X-axis direction and the Y-axis direction is assumed to be a Z-axis direction. In addition, in the drawings referred to below, one side (a side where the flexible wiring board 40i is provided) in the X-axis direction is illustrated as an X1 side, the other side as an X2 side, one side in the Y-axis direction as a Y1 side, the other side as a Y2 side, one side (a side where the source light is incident on) in the Z-axis direction as a Z1 side, and the other side (a side where the display light is emitted) as a Z2 side.

In the projection-type display apparatus 1 described with reference to FIG. 1A to FIG. 3, in mounting the electro-optical panels 40(R), 40(G), and 40(B) on the optical unit 9, each of the electro-optical panels 40(R), 40(G), and 40(B) are respectively mounted as electro-optical modules 10(R), 10(G), and 10(B) described below. The electro-optical panels 40(R), 40(G), and 40(B) have the same configurations and the electro-optical modules 10(R), 10(G), and 10(B) including the electro-optical panels 40(R), 40(G), and 40(B) also have the same configurations for red (R), green (G), and blue (B). Therefore, in the description below, the electro-optical panels 40(R), 40(G), and 40(B) and the electro-optical modules 10(R), 10(G), and 10(B) will be described with omission of (R), (G), and (B) illustrating the corresponding colors.

As illustrated in FIG. 4A and FIG. 4B, in the electro-optical panel 40, a transparent first substrate 51 (element substrate) and a transparent second substrate 52 (opposing substrate) are adhered by a sealing material 407 via a predetermined gap. The first substrate 51 and the second substrate 52 are made from quartz or heat-resistant glass, and in the present embodiment, quartz is used for the first substrate 51 and the second substrate 52. In the present embodiment, the electro-optical panel 40 is a liquid crystal panel, and between the first substrate 51 and the second substrate 52, a liquid crystal layer as the electro-optical material layer 450 is held in the area surrounded by the sealing material 407. The sealing material 407 is provided in a frame shape along the outer edge of the second substrate 52. The sealing material 407 is a photo-curable adhesive, a thermosetting adhesive, or a both photo-curable and thermosetting adhesive, and a gap material such as glass fiber or glass beads is incorporated for making the distance between the two substrates be a predetermined value.

In the present embodiment, the first substrate 51 is a quadrangle in a plan view, and includes four side surfaces 511, 512, 513, and 514 made from four sides of the quadrangle in a plan view. The second substrate 52 also is a quadrangle in a plan view similar to the first substrate 51, and includes four side surfaces 521, 522, 523, and 524 made from four sides of the quadrangle. At a substantial center of the electro-optical panel 40, an image display area 40a that emits the modulated light is provided as a quadrangular area. In response to the shape, the sealing material 407 also is provided in a quadrangle, and a peripheral area 40c having a quadrangular frame shape is provided between an inner peripheral edge of the sealing material 407 and an outer peripheral edge of the image display area 40a.

In the present embodiment, the size of the first substrate 51 is larger than that of the second substrate 52, the four side surfaces 511, 512, 513, and 514 of the first substrate 51 respectively protrude outward from the four side surfaces 521, 522, 523, and 524 of the second substrate 52. For this reason, around the second substrate 52, end portions 40s, 40t, 40u, and 40v are formed by the first substrate 51 and the four side surfaces 521, 522, 523, and 524 of the second substrate 52. In the end portions 40s, 40t, 40u, and 40v, the first substrate 51 is in a state of protruding from the second substrate 52.

Pixels that include a transparent pixel electrode 405a and a pixel transistor (a switching element/not illustrated) corresponding to the pixel electrode 405a are formed on the image display area 40a of the first surface 51a opposing the second substrate 52 among a first surface 51a and a second surface 51b of the first substrate 51, in a matrix shape, and an opposing film 416 is formed on the upper layer side of the pixel electrode 405a. In addition, in the first surface 51a of the first substrate 51, a dummy pixel electrode 405b which is simultaneously formed with the pixel electrode 405a is formed in a peripheral area 40c. A configuration of the dummy pixel electrode 405b is adopted, in which the dummy pixel electrode 405b is electrically connected to the dummy pixel transistor, the dummy pixel electrode 405b is directly and electrically connected to a wiring without providing the dummy pixel transistor, or the dummy pixel electrode 405b is in a floating state to which an electric potential is not applied.

In addition, in the first substrate 51, the side surface 514 positioned at one side in the Y direction protrudes from the side surface 524 of the second substrate 52 more than the other side surfaces 511, 512, and 513, and on the surface (the first surface 51a) of the second substrate 52 side of the protrusion portion 515, a data line drive circuit 401 and a plurality of terminals 402 are formed along the side surface 514. In addition, on the first substrate 51, a scanning line drive circuit 404 is formed along the side surfaces 511 and 512. A flexible wiring board 40i is connected to the terminal 402, and various electric potentials or various signals are input to the first substrate 51 via the flexible wiring board 40i. In the first substrate 51, an adhesive for reinforcement 41 is applied across the side surface 514 and the flexible wiring board 40i.

A transparent common electrode 421 is formed on a first surface 52a opposing the first substrate 51 among a first surface 52a and a second surface 52b of the second substrate 52, and on the upper layer of the transparent common electrode 421, an alignment film 426 is formed. The common electrode 421 is formed on the substantially entire surface of the second substrate 52 or formed across a plurality of pixels as a plurality of strip-shaped electrodes. In the present embodiment, the common electrode 421 is formed on the substantially entire surface of the second substrate 52. In addition, on the first surface 52a of the second substrate 52, a light shielding layer 408 is formed on the lower layer side of the common electrode 421. In the present embodiment, the light shielding layer 408 is formed in a frame shape extending along the outer peripheral edge of the image display area 40a, and the image display area 40a is defined by the inner edge of the light shielding layer 408. The outer peripheral edge of the light shielding layer 408 is in a position across the gap from the inner peripheral edge of the sealing material 407, and the light shielding layer 408 and the sealing material 407 are not overlaying. In addition, in some cases, in the second substrate 52, in an area overlapping the area interposed by the adjacent pixel electrode 405a, a light shield layer which is formed simultaneously with the light shielding layer 408 is formed as a black matrix or a black stripe.

In the first substrate 51, an inter-substrate conduction electrode 409 that allows electrical conduction between the first substrate 51 and the second substrate 52 is formed in the area overlapping the corner portion of the second substrate 52 on the outer side of the sealing material 407. Between the inter-substrate conduction electrode 409 and the second substrate 52, an inter-substrate conduction material 409a including conductive particles is disposed, and the common electrode 421 of the second substrate 52 is electrically connected to the first substrate 51 side via the inter-substrate conduction material 409a and the inter-substrate conduction electrode 409. For this reason, a common electric potential is applied to the common electrode 421 from the first substrate 51 side. The sealing material 407 is disposed along the outer peripheral edge of the second substrate 52 with substantially the same size. However, the sealing material 407 is provided so as to pass through the inward side from the area overlapping the corner portion of the second substrate 52 avoiding the inter-substrate conduction electrode 409.

In the electro-optical panel 40, in the present embodiment, since the pixel electrode 405a and the common electrode 421 are formed of a transparent conduction film such as an ITO film, the electro-optical panel 40 is a transmission type liquid crystal panel. In a case of the transmission type liquid crystal panel (the electro-optical panel 40), the light incident from one of the first substrate 51 or the second substrate 52 is modulated while the light passes through and is emitted from the other substrate. In the configuration in the present embodiment, the light incident from the second substrate 52 (illustrated by an arrow L11) passes through the first substrate 51 and is emitted as the modulated light (illustrated by an arrow L12). For this reason, the second substrate 52 is disposed on the one side Z1 in the Z-axis direction and the first substrate 51 is disposed on the other side Z2 in the Z direction. If the common electrode 421 is formed of the transparent conduction film and the pixel electrode 405a is formed of reflective conduction film, it is possible to configure a reflection type liquid crystal panel. In a case of the reflection type liquid crystal panel, the light incident from the second substrate 52 side is modulated while the light is reflected and is emitted from the first substrate 51. Since the electro-optical panel 40 in the present embodiment is used as a light bulb in the projection-type display apparatus (the liquid crystal projector), the color filter is not formed. However, in a case where the electro-optical panel 40 is used as a direct-view type display device of an electronic apparatus such as a mobile computer or a mobile phone, the color filter is formed on the second substrate 52.

Overall Configuration of Electro-optical Module 10

Figure 5:
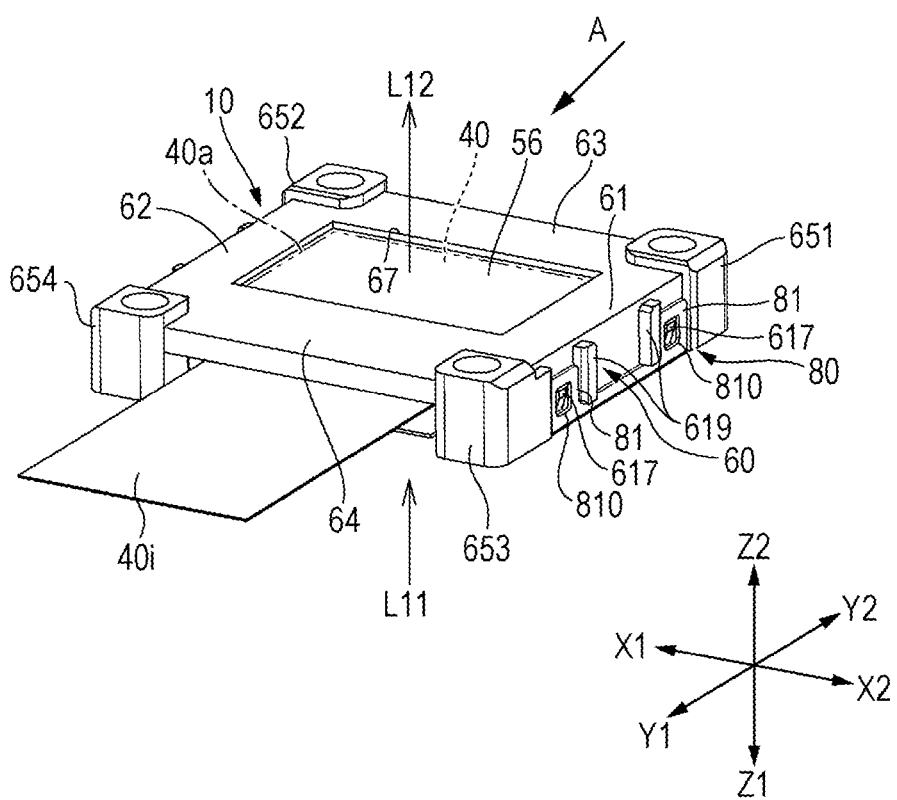
FIG. 5 is a perspective view of the electro-optical module in Embodiment 1 of the invention seen from a light emitting side.
Figure 6A:
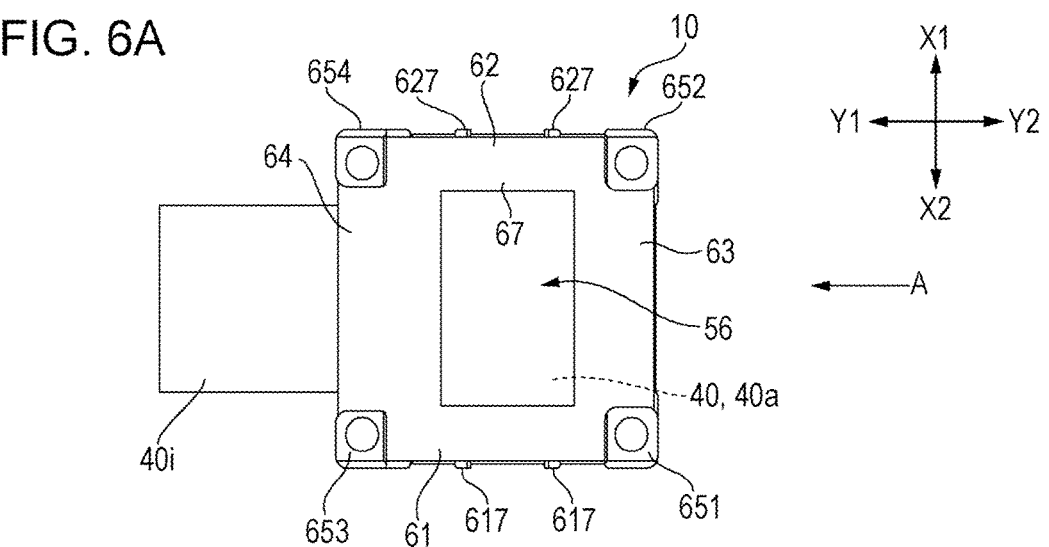
FIG. 6A, FIG. 6B, and FIG. 6C are explanatory drawings of the electro-optical module in Embodiment 1 of the invention.
Figure 6B:
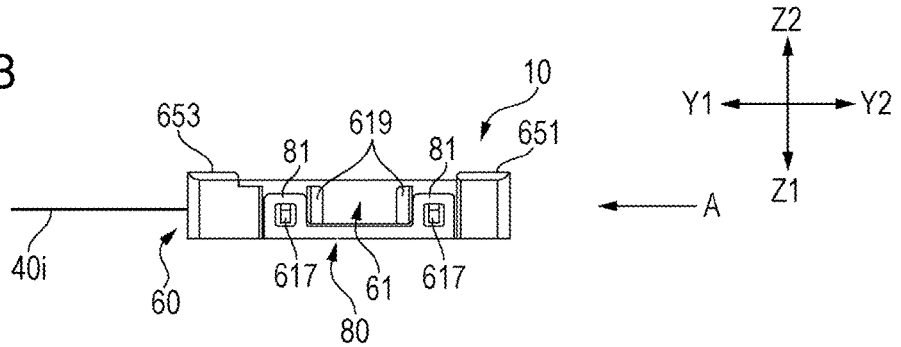
Figure 6C:
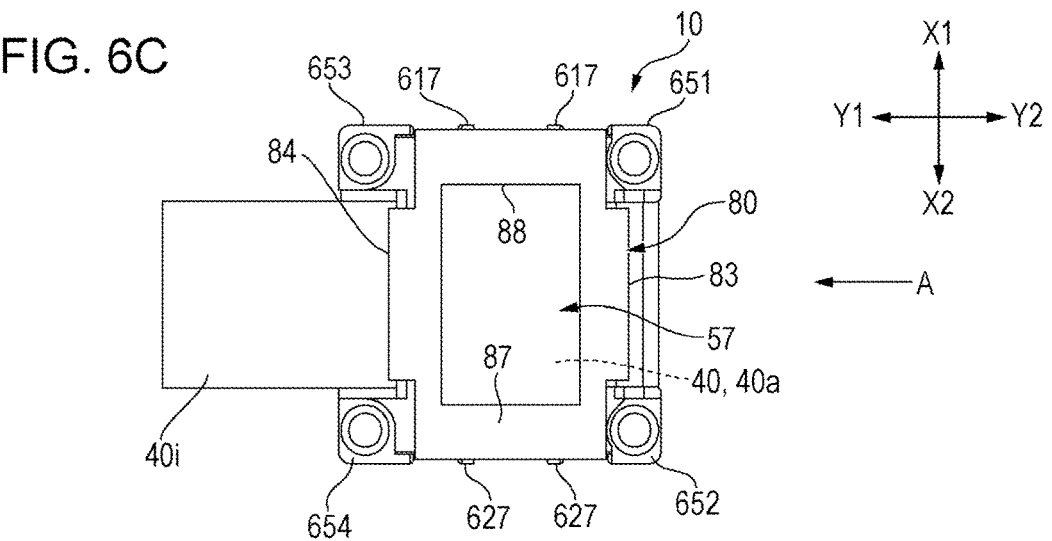
Figure 7A:
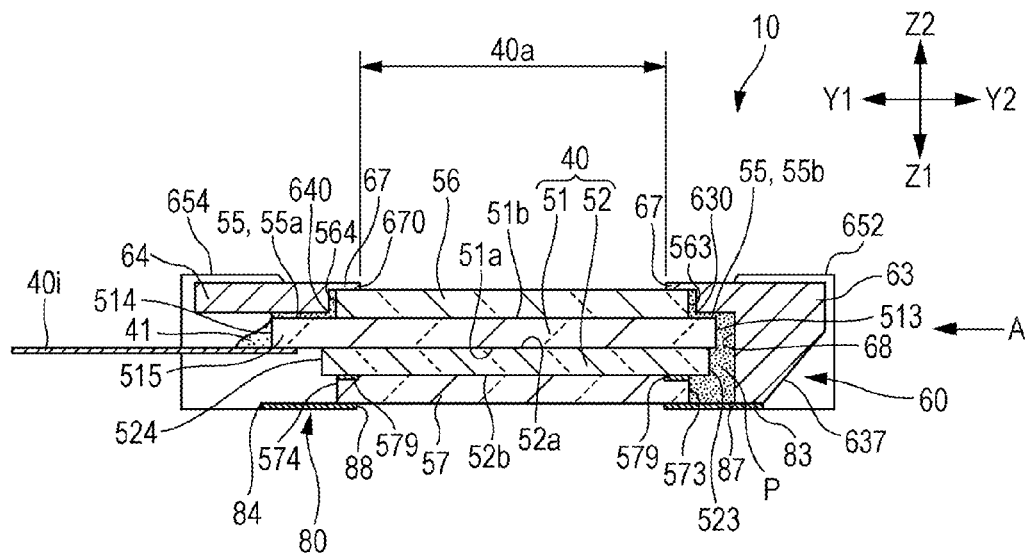
FIG. 7A and FIG. 7B are cross-sectional views of the electro-optical module in Embodiment 1 of the invention.
Figure 7B:
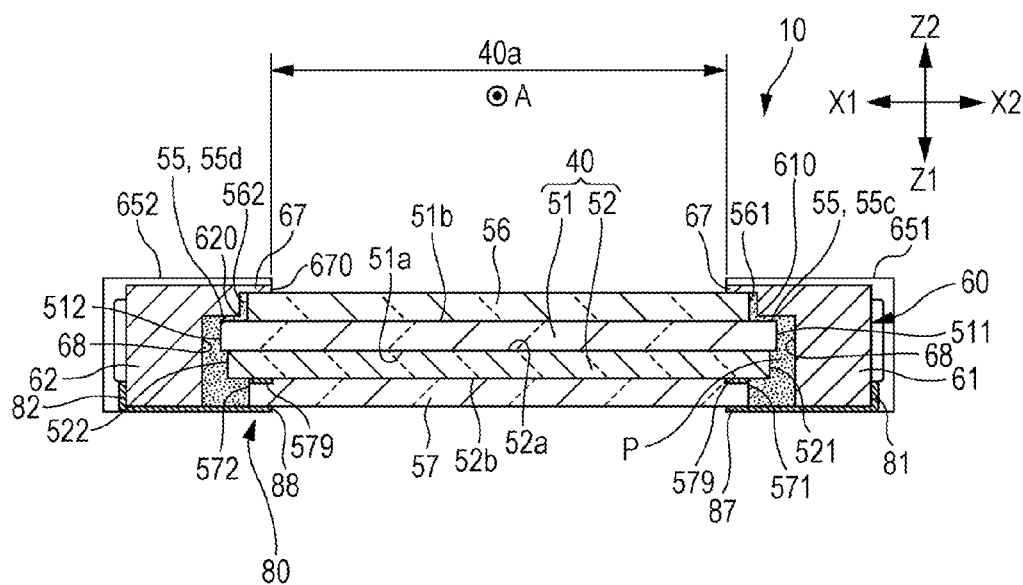
Figure 8:
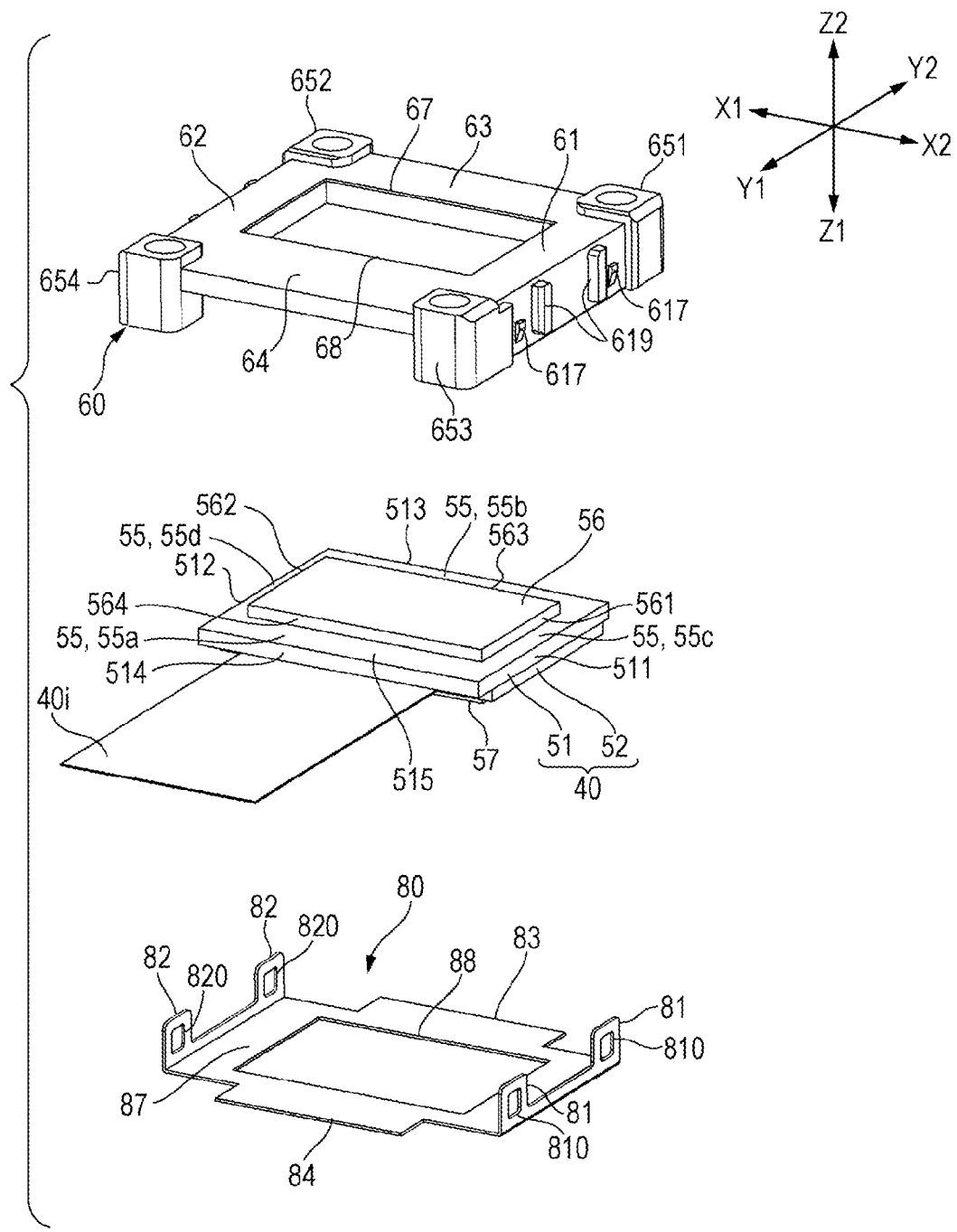
FIG. 8 is an exploded perspective view of the exploded electro-optical module in Embodiment 1 of the invention seen from the light emitting side.

FIG. 5 is a perspective view of the electro-optical module in Embodiment 1 of the invention seen from the light emitting side. FIG. 6A, FIG. 6B, and FIG. 6C are explanatory drawings of the electro-optical module in Embodiment 1 of the invention. FIG. 6A is a plan view of the electro-optical module seen from the light emitting side, FIG. 6B is a side view seen from the other side X2 in the X-axis direction, and FIG. 6C is a bottom view seen from the light incident side. FIG. 7A and FIG. 7B are cross-sectional views of the electro-optical module in Embodiment 1 of the invention. FIG. 7A is a cross-sectional view of the electro-optical module taken from the YZ plane and FIG. 7B is a cross-sectional view taken from the XZ plane. FIG. 8 is an exploded perspective view of the exploded electro-optical module in Embodiment 1 of the invention seen from the light emitting side.

As illustrated in FIG. 5A to FIG. 8, in mounting the electro-optical panel 40 on the optical unit 9 of the projection-type display apparatus 1, for the purpose of reinforcement, the electro-optical panel 40 is the electro-optical module 10 held by the frame 60. In the electro-optical module 10 in the embodiment, in addition to the electro-optical panel 40 and the frame 60, a first transparent plate 56, a second transparent plate 57, and a light shielding plate 80 of the incident side, all of which will be described below, are used. Hereinafter, a detailed configuration of the electro-optical module 10 will be described with reference to mainly FIG. 7A and FIG. 7B.

Configuration of First Transparent Plate 56 and Second Transparent Plate 57

As illustrated in FIG. 4B, FIG. 7A, FIG. 7B and the like, in the present embodiment, in configuring the electro-optical module 10 using the electro-optical panel 40, on the second surface 51b of the first substrate 51 (outer surface/the surface of the first substrate 51 opposite to the second substrate 52), the first transparent plate 56 (the first substrate side transparent plate) is adhered by an adhesive or the like, and on the second surface 52b of the second substrate 52 (outer surface/the surface of the second substrate 52 opposite to the first substrate 51), the second transparent plate 57 (the second substrate side transparent plate) is adhered by an adhesive or the like. Each of the first transparent plate 56 and the second transparent plate 57 is configured as dust-proof glass, and dust or the like is prevented from sticking on the outer surface of the first substrate 51 (the second surface 51b) and the outer surface of the second substrate 52 (the second surface 52b). For this reason, even though the dust may stick to the electro-optical panel 40, the dust is separated from the electro-optical material layer 450. Therefore, in the projection-type display apparatus 1 described with reference to FIG. 1A and FIG. 1B or the like, since the dust is in a defocused state, it is possible to prevent the dust from being projected as an image in the projected image. Quartz or heat-resistant glass is used in the first transparent plate 56 and the second transparent plate 57. In the present embodiment, similarly to the first substrate 51 and the second substrate 52, quartz is used in the first transparent plate 56 and the second transparent plate 57, and the thickness thereof is 1.1 to 1.2 mm.

Here, the first transparent plate 56 is configured so as to overlap at least the image display area 40a of the electro-optical panel 40 in a state that a part of the second surface 51b of the first substrate 51 protrudes. Specifically, the first transparent plate 56 has a rectangular shape in a plan view and is smaller than the first substrate 51 in size, and, in a plan view, each of the side surfaces 561, 562, 563, and 564 of the first transparent plate 56 are positioned on the inward side from the side surfaces 511, 512, 513, and 514 of the first substrate 51 in the entire circumference of the first transparent plate 56. For this reason, in a plan view, each of the side surfaces 561, 562, 563, and 564 of the first transparent plate 56 are positioned between the side surfaces 511, 512, 513, and 514 of the first substrate 51 and the end portion of the image display area 40a, and around the first transparent plate 56, step portions are configured with the side surfaces 561, 562, 563, and 564 of the first transparent plate 56 and the second surface 51b of the first substrate 51. Therefore, in the second surface 51b of the first substrate 51, a protrusion surface 55 protruding from the first transparent plate 56 is formed so as to surround the entire circumference of the first transparent plate 56. In the protrusion surface 55, a protrusion surface 55 in a side where the side surface 514 (the protrusion portion 515) is positioned is assumed to be a first protrusion surface 55a, and a protrusion surface 55 in the opposite side (the side where the side surface 513 is positioned) interposing the first transparent plate 56 with respect to the first protrusion surface 55a is assumed to be a second protrusion surface 55b. In addition, the protrusion surface 55 (the protrusion surface 55 at the side where the side surfaces 511 and 512 are positioned) which is positioned between the first protrusion surface 55a and the second protrusion surface 55b is assumed to be a third protrusion surface 55c and 55d.

The second transparent plate 57 is configured so as to overlap at least the image display area 40a of the electro-optical panel 40 in a state that a part of the second surface 52b of the second substrate 52 protrudes. Specifically, the second transparent plate 57 has a rectangular shape in a plan view with a size substantially the same as the first transparent plate 56, and is smaller than the second substrate 52 in size. For this reason, each of the side surfaces 571, 572, 573, and 574 of the second transparent plate 57 are positioned on the inward side from the side surfaces 521, 522, 523, and 524 of the second substrate 52 all around the second transparent plate 57, and are positioned between the side surfaces 521, 522, 523, and 524 of the second substrate 52 and the end portion of the image display area 40a. Therefore, around the second transparent plate 57, step portions are configured with the side surfaces 571, 572, 573, and 574 of the second transparent plate 57 and the second surface 52b of the second substrate 52. In addition, in the second surface 52b of the second substrate 52, a protrusion surface protruding from the second transparent plate 57 is formed so as to surround the entire circumference of the second transparent plate 57.

Configuration of Frame 60

In the present embodiment, the frame 60 is a rectangular frame-shaped resin member or a metal member that includes a rectangular opening portion 68 at the center, and in plan view, includes four wall portions 61, 62, 63, and 64 that surround the first transparent plate 56, the electro-optical panel 40, and the second transparent plate 57. In the wall portions 61, 62, 63, and 64, connecting portions of each of the adjacent frame portions (corner portions) are prism-shaped connecting portions 651, 652, 653, and 654. Thermal conductivity of the frame 60 is higher than that of the first substrate 51, the second substrate 52, the first transparent plate 56, and the second transparent plate 57. For example, the frame 60 is a molded article provided with a metal layer on the surface of the resin member, or is a metal member of aluminum, copper, or iron. In the present embodiment, the frame 60 is a metal member made from aluminum or the like.

In the frame 60, the wall portion 61 faces the side surface 561 of the first transparent plate 56, the side surface of the electro-optical panel 40, and the side surface 571 of the second transparent plate 57. The wall portion 62 faces the side surface 562 of the first transparent plate 56, the side surface of the electro-optical panel 40, and the side surface 572 of the second transparent plate 57. The wall portion 63 faces the side surface 563 of the first transparent plate 56, the side surface of the electro-optical panel 40, and the side surface 573 of the second transparent plate 57. On the other hand, the wall portion 64 is formed in a plane plate shape extending along the protrusion portion 515 of the first substrate 51, and is not configured to face the electro-optical panel 40 on one side in the Y-axis direction. Therefore, the frame 60 is accommodated inside of the first transparent plate 56, the electro-optical panel 40, and the second transparent plate 57 by the wall portions 61, 62, and 63. In addition, since the wall portion 64 is formed in a plane plate shape extending along the protrusion portion 515 of the first substrate 51, it is possible to pull out the flexible wiring board 40i to the outside of the frame 60 so as to extend along the direction inside of the surface of the electro-optical panel 40.

In the inner side surface of four wall portions 61, 62, 63, and 64, the protrusion surface 55 protruding from the first transparent plate 56 of the first substrate 51 and external corner-shaped corner portions 610, 620, 630, and 640 that are bent along the side surfaces 561, 562, 563, and 564 of the first transparent plate 56, are formed. For this reason, the frame 60 faces the protrusion surface 55 protruding from the first transparent plate 56 of the first substrate 51 and the side surfaces 561, 562, 563, and 564 of the first transparent plate 56 by the corner portions 610, 620, 630, and 640. In addition, in the inner side surface of the wall portions 61, 62, and 63, a part that forms the corner portions 610, 620, and 630 protrudes to the inward side and extends from the protruding part in a straight line shape toward the one side Z1 in the Z-axis direction. As a result, when assembling the electro-optical module 10, the first transparent plate 56 side of the first substrate 51 leads the one side Z1 of the frame 60 in the Z-axis direction, and thus it is possible to provide the electro-optical panel 40 in the inside of the frame 60. On the one side Z1 of the wall portion 63 in the Z-axis direction, the end portion of the other side Y2 in the Y-axis direction is a tapered surface 637, and as illustrated by an arrow A, when the cooling air is supplied to the electro-optical module 10 by the air intake fan 15B illustrated in FIG. 1B, the cooling air is guided with a high efficiency to the one side Z1 of the electro-optical module 10 in the Z-axis direction. In addition, when the cooling air is supplied to the electro-optical module 10, the cooling air is also guided to the other side Z2 of the electro-optical module 10 in the Z-axis direction.

In the present embodiment, the width measurement of the protrusion surface 55 and the area of the overlapping surface of the protrusion surface 55 and the frame 60 has the relationships as follows: the third protrusion surfaces 55c and 55d≅the second protrusion surface 55b<the first protrusion surface 55a. That is, in the first substrate 51, in the first protrusion surface 55a side where the protrusion portion 515 to which the flexible wiring board 40i is connected is positioned, the overlapping width with the frame 60 is larger than that in the second protrusion surface 55b which is positioned at the opposite side to the first protrusion surface 55a across the first transparent plate 56.

In addition, in the frame 60, a plate-shaped light shielding portion 67 protrudes to the inside from the end portion of the other side Z2 in the Z-axis direction of the wall portions 61, 62, 63, and 64, and the plate-shaped light shielding portion 67 overlaps the surface opposite to the side where the electro-optical panel 40 is positioned in the first transparent plate 56. In addition, in the plate-shaped light shielding portion 67, an opening portion 670 is formed in the area where the plate-shaped light shielding portion 67 overlaps the image display area 40a of the electro-optical panel 40, and the plate-shaped light shielding portion 67 functions as a border portion of the emitting side with respect to the electro-optical panel 40. Here, the thickness of the plate-shaped light shielding portion 67 is quite small compared to that of the wall portions 61, 62, 63, and 64 (thickness in the Z direction). In the frame 60, a blackening treatment is applied by painting or the like on the surface toward the other side Z2 in the Z-axis direction.

Configuration of Light Shielding Plate 80 in Incident Side

In the light incident side (one side Z1 in the Z-axis direction) with respect to the frame 60, the plate-shaped light shielding plate 80 formed of a metal plate or a resin plate is disposed overlappingly. In the present embodiment, the light shielding plate 80 is formed of a metal plate. The light shielding plate 80 includes a rectangular end plate portion 87 that overlaps in the light incident side with respect to the frame 60, and in the end plate portion 87, an opening portion 88 that overlaps the image display area 40a of the electro-optical panel 40. The opening portion 88 is smaller than the opening portion 68 of the frame 60, and the end plate portion 87 protrudes to the inside of the opening portion 68 around the entire opening portion 68. For this reason, the end plate portion 87 of the light shielding plate 80 functions as a border portion that limits the range in which the light is incident on the electro-optical panel 40.

The light shielding plate 80 includes side plate portions 81, 82, 83, and 84 which extend from the outer edge of the end plate portion 87. Among those side plate portions 81, 82, 83, and 84, the side plate portions 81 and 82 which position on both sides in the X direction are bent at a substantially right angle toward the other side Z2 in the Z-axis direction from the end portion of the end plate portion 87 so as to overlap the outer side surface of the wall portions 61 and 62. In the present embodiment, the side plate portions 81 and 82 are provided at two separate places, and engagement holes 810 and 820 are formed in each of the two side plate portions 81 and 82. On the other hand, on the outer side surface of the wall portions 61 and 62 of the frame 60, protrusions 617 and 627 that fit in each of the engagement holes 810 and 820 are formed. Therefore, the light shielding plate 80 is coupled to the frame 60 and integrated to the frame 60 by the side plate portions 81 and 82 provided so as to interpose the frame 60 from both sides being coupled to the outer side surface of the frame 60. In this state, in the inside of the frame 60, a panel accommodation portion which has the end plate portion 87 of the light shielding plate 80 as a bottom portion is configured, and in the panel accommodation portion, the electro-optical panel 40 on which the first transparent plate 56 and the second transparent plate 57 are adhered is accommodated. Here, on the outer side surface of the wall portions 61 and 62, protrusions 619 and 629 are formed on the side of the protrusions 617 and 627, and the protrusions 619 and 629 are used for the position determination of the side plate portions 81 and 82.

In the present embodiment, a light shielding layer 579 is provided in the area where the end plate portion 87 overlaps the second transparent plate 57, and the forming a border for the incident side is performed by the light shielding layer 579 and the light shielding plate 80. In the present embodiment, the light shielding layer 579 is made by laminating a chromium layer (metal layer/light reflection layer) and a chromium oxide layer (metal compound layer/light absorbing layer) from the second transparent plate 57 side.

Structure Fixed with Adhesive

In the electro-optical module 10 configured in this way, inside of the frame 60, a gap is formed between the first transparent plate 56, the electro-optical panel 40, and the second transparent plate 57, and the adhesive P is interposed between the gaps. For this reason, the adhesive P is interposed between the first transparent plate 56 and the frame 60, between the electro-optical panel 40 and the frame 60, and between the second transparent plate 57 and the frame 60, but the air layer is not interposed.

Here, regarding the adhesive P, one kind of adhesive can be used in all the cases, or the adhesive P interposed between the side surfaces 561 to 564 of the first transparent plate 56 and the frame 60, between the protrusion surface 55 of the first substrate 51 and the frame 60, or the adhesive P used in other portions may be different in types. In this case, for the adhesive P interposed between the side surfaces 561 to 564 of the first transparent plate 56 and the frame 60 and between the protrusion surface 55 of the first substrate 51 and the frame 60, those types with higher thermal conductivity and the lower adhesive strength than the adhesive P used in the other portions, is used. That is, for the adhesive P interposed between the side surfaces 561 to 564 of the first transparent plate 56 and the frame 60 and between the protrusion surface 55 of the first substrate 51 and the frame 60, it is preferable to select the adhesive P with a priority in the high thermal conductivity, and for the adhesive P for the other portions, with a priority in high adhesive strength. According to such a configuration, it is possible to release the heat generated in the electro-optical panel 40 to the frame 60 via the first substrate 51 with a high efficiency.

Method of Manufacturing Electro-optical Module 10

In the method of manufacturing the electro-optical module 10 described referring to FIG. 5A to FIG. 8, firstly, the entire surface of the first transparent plate 56 and the entire surface of the second transparent plate 57 are adhered to the both sides of the electro-optical panel 40 by an adhesive.

Next, the electro-optical panel 40 is provided inside of the frame 60 with the first transparent plate 56 side being preceded from the one side Z1 of the frame 60 in the Z axis direction. As a result, the outer peripheral portion of the first transparent plate 56 is in contact with the plate-shaped light shielding portion 67, and protrusion portion 55 of the first substrate 51 is in contact with the corner portions 610, 620, 630, and 640 of the frame 60, and thus, the position determination of the first transparent plate 56 and the electro-optical panel 40 in the Z direction is performed. In addition, the side surfaces 561, 562, 563, and 564 of the first transparent plate 56 are in contact with the corner portions

610, 620, 630, and 640, and thus, the position determinations of the first transparent plate 56 and the electro-optical panel 40 in the X direction and the Y direction are performed. At this time, the adhesive P is applied to the vicinity of the corner portions 610, 620, 630, and 640 of the frame 60, in advance.

Then, after the first transparent plate 56, the electro-optical panel 40, and the second transparent plate 57 are accommodated inside of the frame 60, the adhesive P is filled in between the second transparent plate 57 and the frame 60.

Thereafter, the light shielding plate 80 is coupled to the frame 60, and then, in this state, the adhesive P may be cured. Regarding the fixing of the frame 60 and the electro-optical panel 40, only the adhesive P applied before the accommodation of the electro-optical panel 40 in the frame 60 may be used.

Main Effects of the Present Embodiment

As described above, in the electro-optical module 10 in the present embodiment, on the second surface 51*b* of the first substrate 51 (the surface opposite to the second substrate 52) and the second surface 52*b* of the second substrate 52 (the surface opposite to the first substrate 51), since the first transparent plate 56 and the second transparent plate 57 are provided so as to overlap the image display area 40*a*, dust does not adhere on the position near the electro-optical material layer 450 (liquid crystal layer). Therefore, even in a case where the image generated by the electro-optical panel 40 is projected, the influence of dust hardly affects the image.

In addition, in the present embodiment, the first transparent plate 56 is provided such that a part of the second surface 51*b* of the first substrate 51 protrudes, and the corner portions 610, 620, 630, and 640 of the frame 60 face the protrusion surface 55 protruding from the first transparent plate 56 of the first substrate 51 and the side surfaces 561, 562, 563, and 564 of the first transparent plate 56. In addition, the thermal conductivity of the frame 60 is higher than that of the first substrate 51 and second substrate 52. For this reason, it is possible to release the heat generated in the electro-optical panel 40 to the frame 60 from the first substrate 51 and the first transparent plate 56 with a high efficiency. Therefore, it is possible to suppress the deterioration of the electro-optical material layer 450 caused by the increase of the temperature of the electro-optical panel 40.

In addition, in accommodating the electro-optical panel 40 in a state in which the heat dissipation is high, since one frame 60 is used, the number of components decreases and the number of assembly processes may also decrease. Therefore, it is possible to decrease the cost of the electro-optical module 10.

In addition, the adhesive P is interposed between the protrusion surface 55 protruding from the first transparent plate 56 of the first substrate 51 and the frame 60 and between the side surfaces 511, 512, and 513 of the first substrate 51 and the frame 60, but the air layer is not interposed. Furthermore, the adhesive P is interposed between the first transparent plate 56 and the frame 60, between the electro-optical panel 40 and the frame 60, and between the second transparent plate 57 and the frame 60, but the air layer is not interposed. Therefore, it is possible to release the heat generated in the electro-optical panel 40 to the frame 60 from the first substrate 51 with a high efficiency.

In addition, the size of the first transparent plate 56 is smaller than that of the first substrate 51, and the protrusion surface 55 of the first substrate 51 and the corner portions 610, 620, 630, and 640 of the frame 60 are provided so as to surround the entire circumference of the first transparent plate 56. For this reason, since the overlapping area of the protrusion surface 55 of the first substrate 51 and the frame 60 is large, it is possible to release the heat generated in the electro-optical panel 40 to the frame 60 from the first substrate 51 with a high efficiency.

In addition, since a side of the first substrate 51 where the protrusion portion 515 to which the flexible wiring board 40*i* is connected is positioned is surrounded by the air layer, it is difficult for the heat to be dissipated. In addition, when the cooling air (illustrated by the arrow A) is supplied to the electro-optical module 10, since the side of the first substrate 51 where the protrusion portion 515 to which the flexible wiring board 40*i* is connected is positioned becomes the downwind side, the cooling effect is small. However, in this embodiment, in the first substrate 51, in the first protrusion surface 55*a* side where the protrusion portion 515 is positioned, the overlapping width with respect to the frame 60 is larger than that of the second protrusion surface 55*b* which is positioned at the side opposite to the first protrusion surface 55*a* across the first transparent plate 56, and thus, the heat dissipation is high. Therefore, according to the present embodiment, the heat on the side where the protrusion portion 515 is positioned can also be dissipated with a high efficiency, and thus, it is possible to suppress the increase of the temperature.

Furthermore, for the first substrate 51 and the second substrate 52, the frame 60 overlaps the protrusion portion of the first substrate 51 which is the element substrate that includes a pixel electrode and a switching element. For this reason, when the light passes through the electro-optical panel 40, the heat generation in the first substrate 51 is larger than that in the second substrate 52. However, in the present embodiment, since the frame 60 overlaps the protrusion surface 55 of the element substrate (the first substrate 51) the heat generation is high. Therefore, it is possible to release the heat generated in the electro-optical panel 40 with a high efficiency.

In addition, in the present embodiment, since the plate-shaped light shielding portion 67 is provided on the frame 60, it is not necessary to dispose a light shielding plate on the first transparent plate 56 side. In addition, the thickness of the plate-shaped light shielding portion 67 is quite small compared to the thickness (dimension in the Z-axis direction) of the wall portions 61, 62, 63, and 64. For this reason, as illustrated by the arrow A, when the cooling air flow is formed along the surface of the other side Z2 of the electro-optical module 10 in the Z-axis direction by the air intake fan 15B illustrated in FIG. 1B, the cooling air smoothly enters the opening portion 670 of the plate-shaped light shielding portion 67 and flows to the one side Y1 from the other side Y2 in the Y-axis direction. For this reason, it is possible to release the heat generated in the electro-optical panel 40 to the cooling air via the first transparent plate 56.

Modification Example 1 of Embodiment 1

Figure 9A:
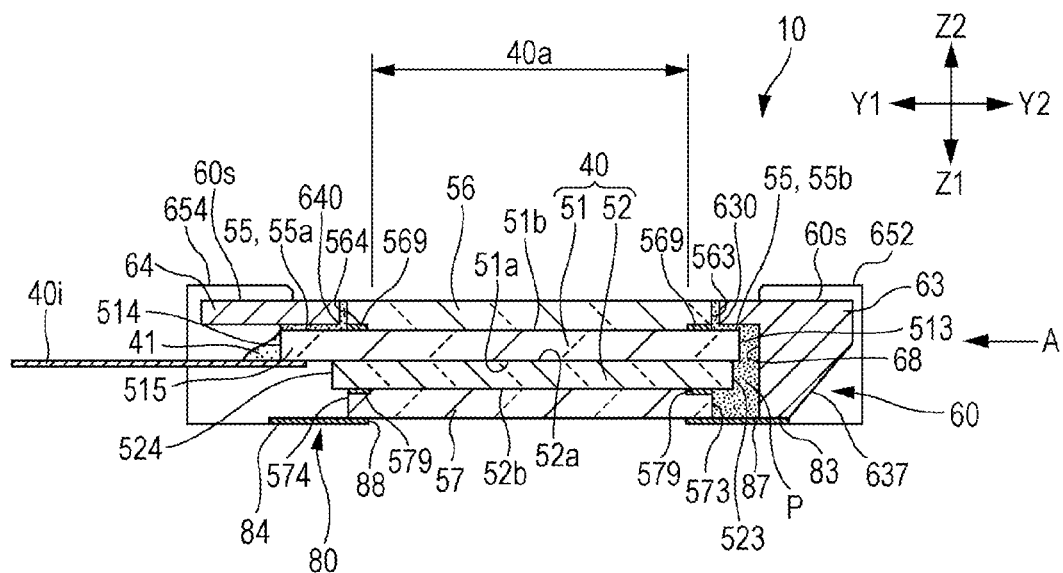
FIG. 9A and FIG. 9B are cross-sectional views of the electro-optical module in modification example 1 of Embodiment 1 of the invention.
Figure 9B:
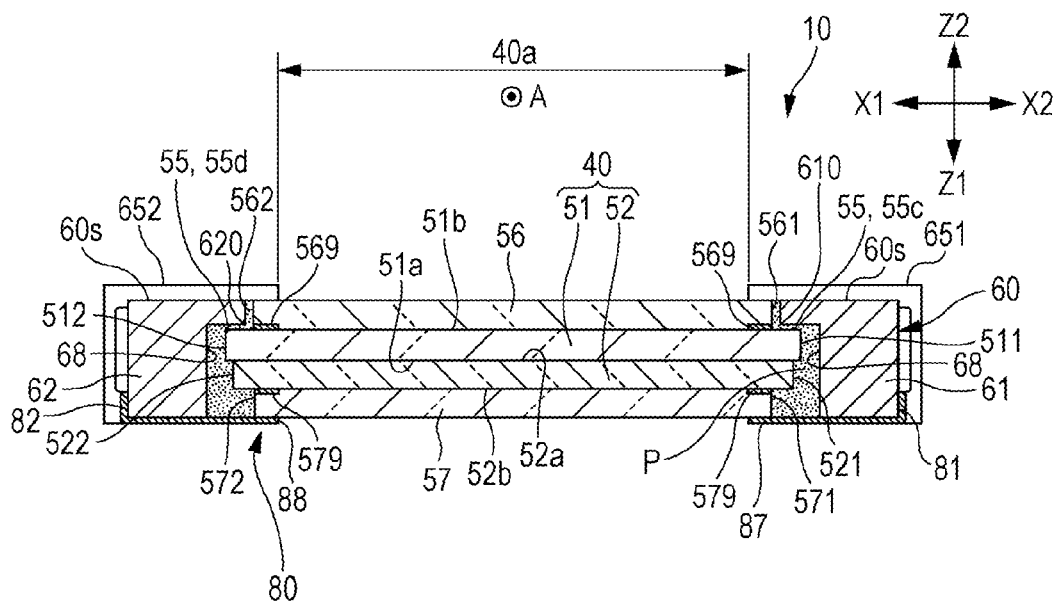

FIG. 9A and FIG. 9B are cross-sectional views of the electro-optical module 10 in modification example 1 of Embodiment 1 of the invention. FIG. 9A is a YZ cross-sectional view of the electro-optical module and FIG. 9B is an XZ cross-sectional view of the same. Since the basic configuration in the modification example is similar to that in Embodiment 1, the common portions will be referred to by common signs, and the description thereof will be omitted.

As illustrated in FIG. 9A and FIG. 9B, in the electro-optical module 10 in the present example also, similarly to Embodiment 1, the corner portions 610, 620, 630, and 640 of the frame 60 face the protrusion surface 55 protruding from the first transparent plate 56 of the first substrate 51 and the side surfaces 561, 562, 563, and 564 of the first transparent plate 56.

In the present example, differently from Embodiment 1, a light shielding layer 569 for forming a border is formed on the surface of the electro-optical panel 40 side of the first transparent plate 56, and the plate-shaped light shielding portion 67 described referring to FIG. 7A and FIG. 7B is not formed on the frame 60. For this reason, on the other side Z2 in the Z-axis direction where the first transparent plate 56 is positioned, an end portion 60s of the frame 60 and the surface of the first transparent plate 56 on opposite side to the first substrate 51 are positioned in the same plane. Here, the light shielding layer 569 is made by laminating the chromium oxide layer (metal compound layer/light absorbing layer) and the chromium layer (metal layer/light reflection layer) from the first transparent plate 56 side. Other configurations are similar to that in Embodiment 1.

According to the configuration, on the other side Z2 of the first transparent plate 56 in the Z-axis direction, there is no step difference caused by the plate-shaped light shielding portion 67. Therefore, as illustrated by the arrow A, when the cooling air flow is formed along the surface of the other side Z2 of the electro-optical module 10 in the Z axis direction by the air intake fan 15B illustrated in FIG. 1B, the cooling air smoothly flows from the other side Y2 in the Y axis direction to the one side Y1 along the surface of the other side Z2 of the first transparent plate 56 in the Z axis direction. Therefore, it is possible to release the heat generated in the electro-optical panel 40 to the cooling air via the first transparent plate 56 and the fame 60.

Embodiment 2

Figure 10A:
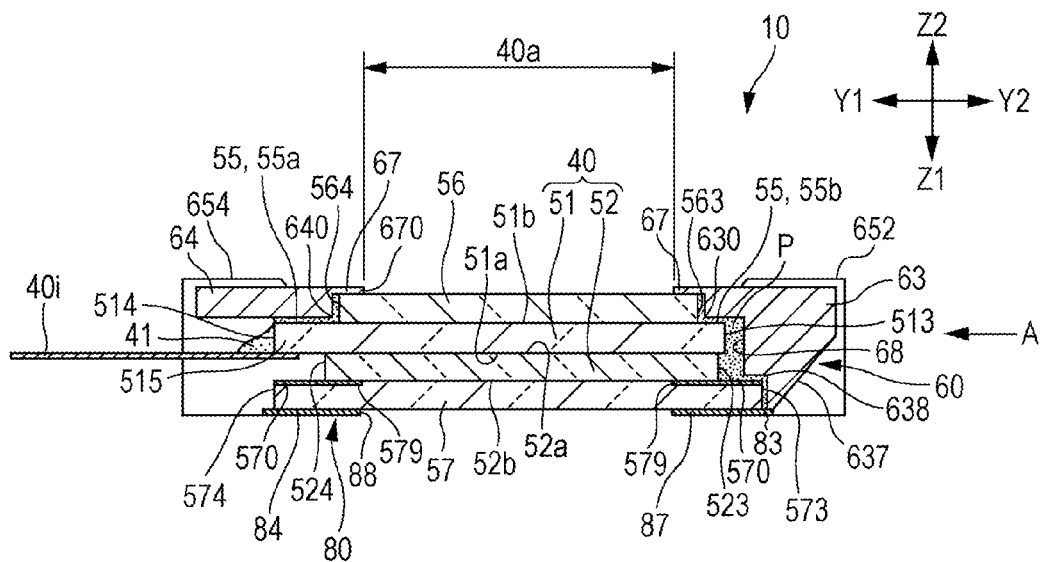
FIG. 10A and FIG. 10B are cross-sectional views of an electro-optical module in Embodiment 2 of the invention.
Figure 10B:
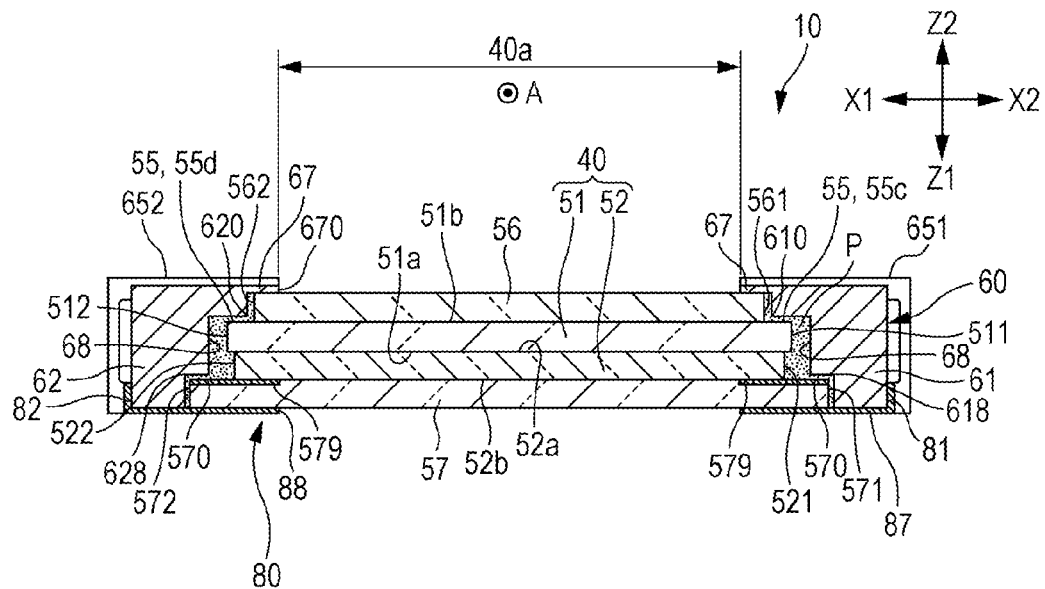

FIG. 10A and FIG. 10B are cross-sectional views of an electro-optical module 10 in an embodiment 2 of the invention. FIG. 10A is a YZ cross-sectional view of the electro-optical module and FIG. 10B is an XZ cross-sectional view of the same. Since the basic configuration in the modification example is similar to that in Embodiment 1, the common portions will be referred to by the same signs, and the description thereof will be omitted.

As illustrated in FIG. 10A and FIG. 10B, in the electro-optical module 10 in the present embodiment also, similarly to the Embodiment 1, the corner portions 610, 620, 630, and 640 of the frame 60 face the protrusion surface 55 protruding from the first transparent plate 56 of the first substrate 51 and the side surfaces 561, 562, 563, and 564 of the first transparent plate 56, and the adhesive P is interposed therebetween.

In the present embodiment, the second transparent plate 57 is adhered to the second surface 52b of the second substrate 52 such that a part thereof protrudes from the second substrate 52. Specifically, second transparent plate 57 has a rectangular shape in a plan view and has a size larger than the second substrate 52, and each of the side surfaces 521, 522, 523, and 524 of the second substrate 52 is positioned at the inner side than the side surfaces 571, 572, 573, and 574 of the second transparent plate 57 respectively in the entire circumference in a plan view. For this reason, each of the side surfaces 521, 522, 523, and 524 of the second substrate 52 is positioned between the side surfaces 571, 572, 573, and 574 of the second transparent plate 57 and the image display area 40a, and around the second transparent plate 57, a step portion is formed by the side surface 521, 522, 523, and 524 of the second substrate 52 and the second transparent plate 57. In addition, on the surface of the second transparent plate 57 on the second substrate 52 side, the protrusion surface 570 is formed protruded from the second substrate 52 so as to surround the entire circumference of the second substrate 52.

In addition, on the surface of the second transparent plate 57 on the second substrate 52 side, in a plan view, an area that overlaps the second substrate 52 without overlapping the image display area 40a and on the protrusion surface 570, the light shielding layer 579 is continuously and integrally formed. For this reason, the light shielding layer 579 includes a first portion formed inside from the outer edge of the second substrate 52 and the outside of the image display area 40a of the electro-optical panel 40, and a second portion 579b formed to be extended to the protrusion surface 570 from the outer edge of the second substrate 52. Here, the light shielding layer 579 is formed up to the edge of the surface of the second transparent plate 57 on the second substrate 52 side. The light shielding layer 579 is made by laminating a chromium layer (metal layer/light reflection layer) and a chromium oxide layer (metal compound layer/light absorbing layer) from the second transparent plate 57 side, and has light reflection property. For this reason, the thermal conductivity of the light shielding layer 579 is higher than that of the second transparent plate 57.

In correspondence to such a configuration, in the wall portions 61, 62, and 63 of the frame 60, the side surfaces 571, 572, and 573 of the second transparent plate 57 and the internal corner-shaped corner portions 618, 628, and 638 bent along the protrusion surface 570 protruding from the second substrate 52 of the second transparent plate 57 are formed. For this reason, the frame 60 faces the side surfaces 571, 572, and 573 of the second transparent plate 57 and the light shielding layer 579 formed on the protrusion surface 570 protruding from the second substrate 52 of the second transparent plate 57 by the corner portions 618, 628, 638, and 648. In addition, the adhesive P is interposed between the frame 60 and the side surfaces 571, 572, 573, and 574 of the second transparent plate 57, and between the frame 60 and the light shielding layer 579 formed on the protrusion surface 570 of the second transparent plate 57, but the air layer is not interposed. Other configurations are similar to that in Embodiment 1.

According to the configuration, it is possible to release the heat generated in the electro-optical panel 40 to the frame 60 from the first substrate 51 and the first transparent plate 56 with a high efficiency, and to the frame 60 from the second transparent plate 57 with a high efficiency. In addition, since the thermal conductivity of the light shielding layer 579 is higher than that of the second transparent plate 57, it is possible to release the heat of the electro-optical panel 40 to the frame 60 via the light shielding layer 579. In addition, it is possible to release the heat of the light shielding layer 579 generated by the light absorption to the frame 60 via the light shielding layer 579.

Modification Example 1 of Embodiment 2

Figure 11A:
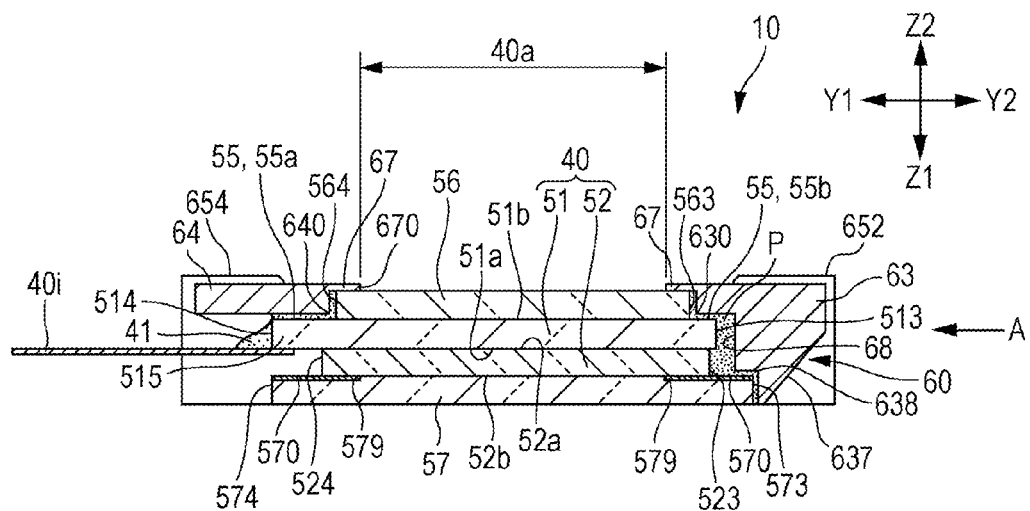
FIG. 11A and FIG. 11B are cross-sectional views of an electro-optical module in modified example 1 of Embodiment 2 of the invention.
Figure 11B:
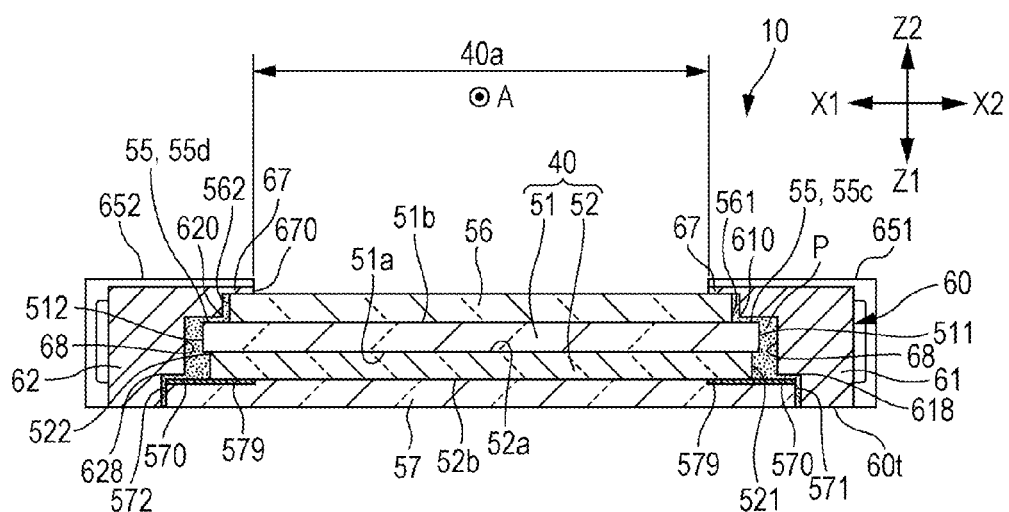

FIG. 11A and FIG. 11B are cross-sectional views of an electro-optical module 10 in a modified example 1 in Embodiment 2 of the invention. FIG. 11A is a YZ cross-sectional view of the electro-optical module and FIG. 11B is an XZ cross-sectional view of the same. Since the basic configuration in the modification example is similar to that in Embodiment 1, the common portions will be referred to by the same signs, and the description thereof will be omitted.

As illustrated in FIG. 11A and FIG. 11B, in the electro-optical module 10 in the present example also, similarly to Embodiment 1, the corner portions 610, 620, 630, and 640 of the frame 60 face the protrusion surface 55 protruding from the first transparent plate 56 of the first substrate 51 and the side surfaces 561, 562, 563, and 564 of the first transparent plate 56. In addition, similarly to Embodiment 2, the corner portions 618, 628, and 638 of the frame 60 face the side surfaces 571, 572, and 573 of the second transparent plate 57 and the protrusion surface 570 protruding from second substrate 52 of the second transparent plate 57.

In the present example, the light shielding layer 579 for forming a border is formed on the surface of the second transparent plate 57 on the electro-optical panel 40, and differently from the Embodiment 2, the light shielding plate 80 is not used. For this reason, on the one side Z1 in the Z-axis direction where the second transparent plate 57 is positioned, the end portion 60t of the frame 60 and the second substrate 52 of the second transparent plate 57 are positioned in the same plane as the surface of the opposite side. The other configurations are similar to that in the Embodiment 2.

According to the configuration, on the one side Z1 of the second transparent plate 57 in the Z-axis direction, there is no step difference caused by the light shielding plate 80. Therefore, as illustrated by the arrow A, when the cooling air flow is formed along the surface of the other side Z2 of the electro-optical module 10 in the Z-axis direction by the air intake fan 15B illustrated in FIG. 1B, the cooling air smoothly flows from the other side Y2 in the Y-axis direction to the one side Y1 along the surface of the one side Z1 of the second transparent plate 57 in the Z-axis direction. Therefore, it is possible to release the heat generated in the electro-optical panel 40 to the cooling air via the second transparent plate 57 and the frame 60.

Modification Example 2 of Embodiment 2

In the electro-optical module 10 described in Embodiment 2 and the modification example 1 of Embodiment 2 above, a configuration may be adopted, in which the light shielding layer 569 for forming a border is formed on the surface of the electro-optical panel 40 side of the first transparent plate 56, and the plate-shaped light shielding portion 67 is not provided on the first transparent plate 56 side as described in the modification example 1 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Embodiment 3

Figure 12A:
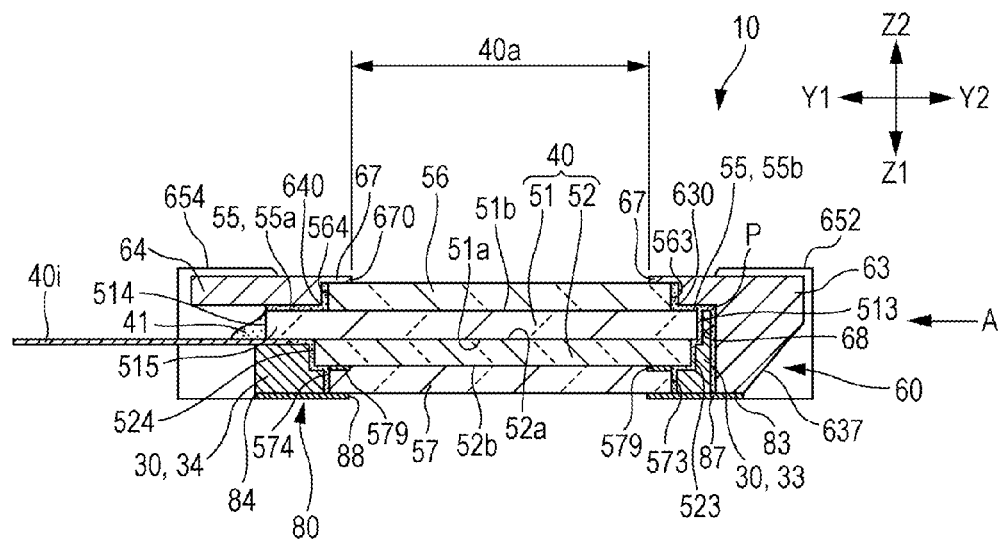
FIG. 12A and FIG. 12B are cross-sectional views of an electro-optical module in Embodiment 3 of the invention.
Figure 12B:
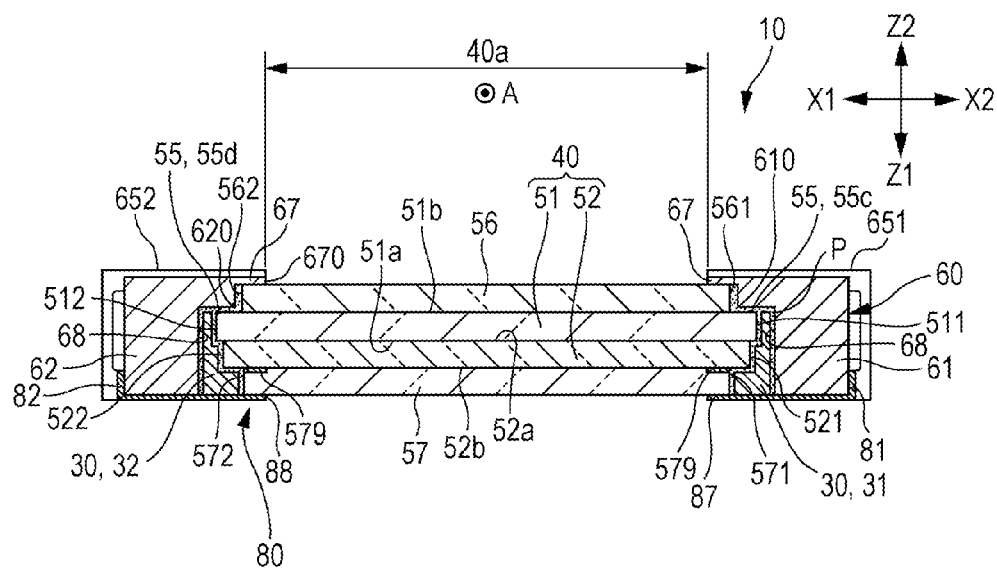

FIG. 12A and FIG. 12B are cross-sectional views of an electro-optical module 10 in Embodiment 3 of the invention. FIG. 12A is a YZ cross-sectional view of the electro-optical module and FIG. 12B is an XZ cross-sectional view of the same. Since the basic configuration in the present embodiment is similar to that in Embodiment 1, the common portions will be referred to by the same signs, and the description thereof will be omitted.

As illustrated in FIG. 12A and FIG. 12B, similarly to the embodiment 1, in the electro-optical module 10 in the present embodiment also, the corner portions 610, 620, 630, and 640 of the frame 60 face the protrusion surface 55 protruding from the first transparent plate 56 of the first substrate 51 and the side surfaces 561, 562, 563, and 564 of the first transparent plate 56, and the adhesive P is interposed therebetween. In addition, in the inner side surfaces of the wall portions 61, 62, and 63, a portion that forms the corner portions 610, 620, and 630 protrudes to the inside, and the inner side surfaces of the wall portions 61, 62, and 63 extend in a straight line shape toward the one side Z1 in the Z-axis direction from the protrusion portion. As a result, when assembling the electro-optical module 10, the first transparent plate 56 side leads the one side Z1 of the frame 60 in the Z-axis direction, and thus it is possible to provide the electro-optical panel 40 in the inside of the frame 60.

In addition, in the electro-optical module 10 in the present embodiment also, similarly to Embodiment 1, the size of the second substrate 52 is smaller than that of the first substrate 51, and the protrusion surface protruding from the second substrate 52 is formed on the first surface 51a of the first substrate 51 so as to surround entire circumference of the second substrate 52. The size of the second transparent plate 57 is smaller than that of the second substrate 52, and the protrusion surface protruding from the second transparent plate 57 is formed on the second surface 52b of the second substrate 52 so as to surround the entire circumference of the second transparent plate 57.

In the present embodiment, in order to improve the heat dissipation from the side surface of the electro-optical panel 40 (the first substrate 51 and the second substrate 52) or from the side surface of the second transparent plate 57 to the frame 60, inside of the frame 60, the rectangular frame-shaped heat dissipation member 30 is disposed around the electro-optical panel 40 and the second transparent plate 57, and the heat dissipation member 30 is bonded to the surface of the light shielding plate 80 side where the electro-optical panel 40 is positioned. In the present embodiment, the heat dissipation member 30 is a member made of metal such as aluminum, copper, or iron, and the thermal conductivity thereof is higher than the first substrate 51 and second substrate 52.

Here, the heat dissipation member 30 includes a wall portion 31 that is positioned between the side surface of the electro-optical panel 40 and the second transparent plate 57 and the wall portion 61 of the frame 60, a wall portion 32 that is positioned between side surface of the electro-optical panel 40 and the second transparent plate 57 and the wall portion 62 of the frame 60, and a wall portion 33 that is positioned between the side surface of the electro-optical panel 40 and the second transparent plate 57 and the wall portion 63 of the frame 60. However, on the one side Y1 in the Y-axis direction, the first substrate 51 of the electro-optical panel 40 largely protrudes. For this reason, a portion of the heat dissipation member 30 which is positioned on the one side Y1 in the Y-axis direction becomes the wall portion 34 that faces only the second substrate 52 and the second transparent plate 57 of the electro-optical panel 40 at the one side Y1 on the Y-axis direction.

In the heat dissipation member 30, the outer side surface of the wall portions 31, 32, and 33 facing the wall portions 61, 62, and 63 of the frame 60 extends in a straight line shape toward the Z-axis direction. On the other hand, the inner side surfaces of the wall portions 31, 32, and 33 have a multi-stage shape bent along the outer shape of the electro-optical panel 40 and the second transparent plate 57. For this reason, the inner side surface of the wall portions 31, 32, and 33 faces the side surfaces 511, 512, and 513 of the first substrate 51, the protrusion surface protruding from the second substrate 52 of the first surface 51a of the first substrate 51, the side surfaces 521, 522, and 523 of the second substrate 52, the protrusion surface protruding from the second transparent plate 57 of the second surface 52b of the second substrate 52, and the side surfaces 571, 572, and 573 of the second transparent plate 57. In addition, the end portion of the other side Z2 of the wall portions 31, 32, and 33 in the Z-axis direction faces the vicinity of the corner portions 610, 620, and 630 of the frame 60. The adhesive P is interposed between the wall portions 31, 32, and 33, and the frame 60, and the electro-optical panel 40 and the second transparent plate 57.

In addition, the inner side surface of the wall portion 34 has a step shape bent along the external shape of the second substrate 52 and the second transparent plate 57. For this reason, the inner side surface of the wall portion 34 faces the side surface 524 of the second substrate 52, the protrusion surface protruding from the second transparent plate 57 of the second surface 52b of the second substrate 52, and the side surface 574 of the second transparent plate 57. In addition, the end surface of the other side Z2 of the wall portion 34 in the Z-axis direction faces the first surface 51a (the protrusion portion 515) of the first substrate 51. The adhesive P is interposed between the wall portion 34 and the second substrate 52 and the second transparent plate 57.

According to the configuration, the present embodiment provides the substantially same effect as that in Embodiment 1, and since the heat dissipation member 30 is interposed between the first substrate 51, the second substrate 52 and the second transparent plate 57 and the frame 60, it is possible to release the heat of the electro-optical panel 40 to the frame 60 via the heat dissipation member 30 with a high efficiency compared to the case where only the adhesive P is interposed therebetween.

Particularly, in a case where the molded article in which the metal layer is provided on the surface of the member made of resin is used as the frame 60, or in a case where the thermal conductivity of the heat dissipation member 30 is higher than that of the frame 60 depending on the metal layer, it is possible to release the heat of the electro-optical panel 40 to the heat dissipation member 30 with a high efficiency. Therefore, by using the heat dissipation member 30, it is possible to suppress the variation of the temperature or the increase of the temperature of the entire electro-optical panel 40. In addition, in a case where the heat capacity of the heat dissipation member 30 is larger than that of the frame 60 such as a case in which the frame 60 is thin, or in a case where there is a thin part in the frame 60, it is possible to release the heat of the electro-optical panel 40 to the heat dissipation member 30 with a high efficiency. Accordingly, by using the heat dissipation member 30, it is possible to suppress the variation of the temperature or the increase of the temperature of the entire electro-optical panel 40.

In addition, since the flexible wiring board 40i extends on the one side Y1 in the Y-axis direction, the frame 60 does not exist on the one side Z1 in the Z axis-direction with respect to the protrusion portion 515 or in the vicinity of the second substrate 52 or the second transparent plate 57. However, in the present embodiment, since the wall portion 34 of the heat dissipation member 30 is disposed, it is possible to release the heat of the electro-optical panel 40 to the frame 60 via the wall portion 34. Specifically, the heat dissipation member 30 includes the wall portion 34, the wall portion 31 that extends between the side surface 521 of the second substrate 52 and the frame 60 from one end side of the wall portion 34, the wall portion 32 that extends between the side surface 522 of the second substrate 52 and the frame 60 from one end side of the wall portion 34, and the wall portion 33 that extends between the second substrate 52 and the frame 60 at the position facing the wall portion 34. Therefore, even on the side where the protrusion portion 515 is positioned, it is possible to release the heat of the electro-optical panel 40 to the frame 60 via the wall portion 34. In addition, when the heat dissipation member 30 is seen in a plan view, since the width of the wall portion 34 is larger than that of the wall portions 31 and 32, even on the side where the protrusion portion 515 is positioned, it is possible to release the heat of the electro-optical panel 40 to the frame 60 via the wall portion 34.

In the process of manufacturing the electro-optical module 10 in such a configuration, for example, after applying the adhesive in the vicinity of the corner portions 610, 620, 630, and 640 of the frame 60, the first transparent plate 56 side leads the one side Z1 of the frame 60 in the Z-axis direction, and thus it is possible to accommodate the electro-optical panel 40 in the inside of the frame 60. Next, after the adhesive P is applied between the second transparent plate 57 and frame 60, the light shielding plate 80 after the heat dissipation member 30 is fixed is coupled to the frame 60.

In the present embodiment, the flexible wiring board 40i and the wall portion 34 of the heat dissipation member 30 face each other, and in the protrusion portion 515, a part protruding from the flexible wiring board 40i and the wall portion 34 of the heat dissipation member 30 face each other. For this reason, it is preferable to prevent a short circuit between the flexible wiring board 40i and the heat dissipation member 30 by a configuration in which the flexible wiring board 40i is curved on the side opposite to the heat dissipation member 30 or by disposing an insulation material such as a coating layer between the flexible wiring board 40i and the wall portion 34 of the heat dissipation member 30. In addition, it is preferable to prevent a short circuit with the conductive layer such as the wiring formed on the protrusion portion 515 by disposing an insulation material such as a coating layer between the part protruding from the flexible wiring board 40i in the protrusion portion 515 and the wall portion 34 of the heat dissipation member 30.

Modification Example of Embodiment 3

In the electro-optical module 10 described in Embodiment 3 above, a configuration may be adopted, in which the light shielding layer 569 for forming a border is formed on the surface of the electro-optical panel 40 side of the first transparent plate 56, and the plate-shaped light shielding portion 67 is not provided on the first transparent plate 56 side as described in the modification example 1 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Embodiment 4

Figure 13A:
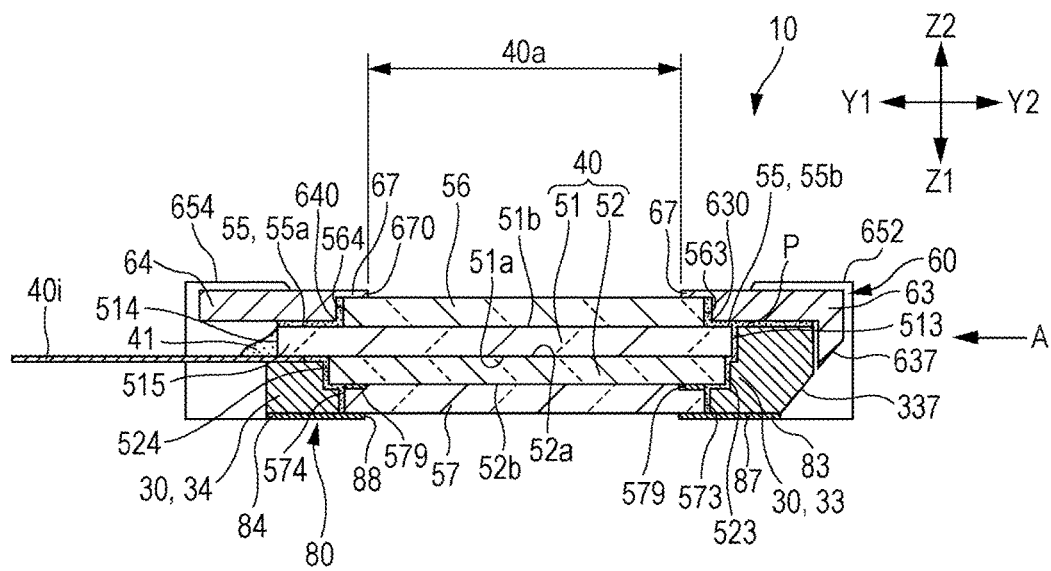
FIG. 13A and FIG. 13B are cross-sectional views of an electro-optical module in Embodiment 4 of the invention.
Figure 13B:
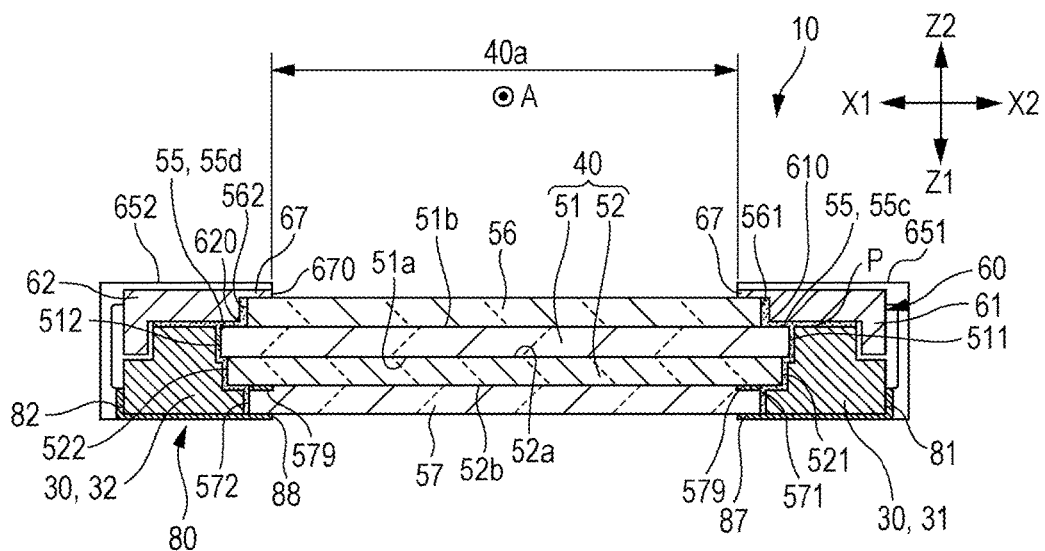

FIG. 13A and FIG. 13B are cross-sectional views of an electro-optical module 10 in Embodiment 4 of the invention. FIG. 13A is a YZ cross-sectional view of the electro-optical module and FIG. 13B is an XZ cross-sectional view of the same. Since the basic configuration in the present embodiment is similar to that in Embodiment 1, the common portions will be referred to by the same signs, and the description thereof will be omitted.

As illustrated in FIG. 13A and FIG. 13B, in the electro-optical module 10 in the present embodiment also, similarly to Embodiment 1, each of the corner portions 610, 620, 630, and 640 of the frame 60 faces the protrusion surface 55 protruding from the first transparent plate 56 of the first substrate 51 and the side surfaces 561, 562, 563, and 564 of the first transparent plate 56, and the adhesive P is interposed therebetween. In addition, the size of the second substrate 52 is smaller than that of the first substrate 51, and the protrusion surface protruding from the second substrate 52 is formed on the first surface 51a of the first substrate 51 so as to surround the entire circumference of the second substrate 52. The size of the second transparent plate 57 is smaller than that of the second substrate 52, the protrusion surface 570 protruding from the second transparent plate 57 is formed on the second surface 52b of the second substrate 52 so as to surround the entire circumference of the second transparent plate 57.

In the present embodiment, similarly to Embodiment 3, in order to improve the heat dissipation from the side surface of the electro-optical panel 40 (the first substrate 51 and the second substrate 52) or from the side surface of the second transparent plate 57 to the frame 60, the rectangular frame-shaped heat dissipation member 30 is disposed around the electro-optical panel 40 and the second transparent plate 57, and the heat dissipation member 30 is a member made of metal such as aluminum, copper, or iron, and the thermal conductivity thereof is higher than the first substrate 51 and the second substrate 52.

Here, the frame 60 is disposed only on a part corresponding to the other side Z2 of the electro-optical module 10 in the Z-axis direction, and on a part corresponding to the one side Z1 of the electro-optical module 10 in the Z-axis direction, the heat dissipation member 30 is disposed.

Specifically, the heat dissipation member 30 includes the wall portion 31 that overlaps the wall portion 61 at the one side Z1 in the Z-axis direction inside of the wall portion 61 of the frame 60, the wall portion 32 that overlaps the wall portion 62 at the one side Z1 in the Z-axis direction inside of the wall portion 62 of the frame 60, and the wall portion 33 that overlaps the wall portion 63 at the one side Z1 in the Z-axis direction inside of the wall portion 63 of the frame 60, and the wall portions 31, 32, and 33 are in a state of protruding at the one side Z1 in the Z-axis direction with respect to the frame 60. For this reason, on the one side Z1 of the wall portion 33 in the Z-axis direction, on the end portion of the other side Y2 in the Y-axis direction, a tapered surface 337 that configures a tapered surface which is continuous with the tapered surface 637 of the wall portion 63 is formed. Therefore, when the cooling air is supplied to the electro-optical module 10 by the air intake fan 15B illustrated FIG. 1B, the cooling air is guided with a high efficiency to the one side Z1 of the electro-optical module 10 in the Z-axis direction.

In addition, the inner side surfaces of the wall portions 31, 32, and 33 have a multi-stage shape bent along the outer shape of the electro-optical panel 40 and the second transparent plate 57. For this reason, the inner side surface of the wall portions 31, 32, and 33 faces the side surfaces 511, 512, and 513 of the first substrate 51, the protrusion surface protruding from the second substrate 52 of the first surface 51a of the first substrate 51, the side surfaces 521, 522, and 523 of the second substrate 52, the protrusion surface protruding from the second transparent plate 57 of the second surface 52b of the second substrate 52, and the side surfaces 571, 572, and 573 of the second transparent plate 57. The adhesive P is interposed between the wall portions 31, 32, and 33, and the frame 60, and the electro-optical panel 40 and the second transparent plate 57.

However, since the first substrate 51 of the electro-optical panel 40 largely protrudes in one side Y1 in the Y-axis direction, a portion of the heat dissipation member 30 positioned on the one side Y1 in the Y-axis direction, becomes the wall portion 34 that faces only the second substrate 52 and the second transparent plate 57 of the electro-optical panel 40 on the one side Y1 in the Y-axis direction. The inner side surface of the wall portion 34 has a step shape bent along the outer shape of the second substrate 52 and the second transparent plate 57. For this reason, the inner side surface of the wall portion 34 faces the side surface 524 of the second substrate 52, the protrusion surface protruding from the second transparent plate 57 of the second surface 52b of the second substrate 52, and the side surface 574 of the second transparent plate 57. In addition, the end surface of the other side Z2 of the wall portion 34 in the Z-axis direction faces the first surface 51a (the protrusion portion 515) of the first substrate 51. The adhesive P is interposed between the wall portion 34 and the second substrate 52 and the second transparent plate 57.

According to the configuration, the present embodiment provides substantially the same effect as that in Embodiment 1, and since the heat dissipation member 30 is disposed around the first substrate 51, the second substrate 52 and the second transparent plate 57, it is possible to release the heat of the electro-optical panel 40 to the heat dissipation member 30 with a high efficiency. In addition, since the flexible wiring board 40i extends on the one side Y1 in the Y-axis direction, the frame 60 does not exist on the one side Z1 in the Z axis-direction with respect to the protrusion portion 515 or in the vicinity of the second substrate 52 or the second transparent plate 57. However, in the present embodiment, since the wall portion 34 of the heat dissipation member 30 is disposed, it is possible to release the heat of the electro-optical panel 40 to the frame 60 via the wall portion 34.

In the process of manufacturing the electro-optical module 10 in such a configuration, the heat dissipation member 30 can be used as the member for position determination of the second transparent plate 57. Specifically, when the second transparent plate 57 is adhered to the electro-optical panel 40, the electro-optical panel 40 is disposed inside of the heat dissipation member 30, then, the second transparent plate 57 and the second surface 52b of the second substrate 52 are bonded while overlapping the second transparent plate 57 on the second surface 52b of the second substrate 52 via the opening portion of the heat dissipation member 30 from one side Z1 in the Z-axis direction. At this time, if the adhesive P is applied in the inner surface of the heat dissipation member 30 in advance, it is possible to adhere and fix the electro-optical panel 40 or the second transparent plate 57 to the heat dissipation member 30.

Next, after applying the adhesive P in the vicinity of or on the inner surface of the corner portions 610, 620, 630, and 640 of the frame 60, the electro-optical panel 40 to which the first transparent plate 56, the second transparent plate 57, and the heat dissipation member 30 are adhered is accommodated inside of the frame 60, the light shielding plate 80 is coupled to the frame 60, and then, if the adhesive P is cured, the assembling of the electro-optical module 10 is completed.

In addition, after applying the adhesive P in the vicinity of or on the inner surface of the corner portions 610, 620, 630, and 640 of the frame 60, the electro-optical panel 40 to which the first transparent plate 56 is adhered and the heat dissipation member 30 is accommodated inside of the frame 60, and then, the second transparent plate 57 and the second surface 52b of the second substrate 52 may be bonded while overlapping the second transparent plate 57 on the second surface 52b of the second substrate 52 via the opening portion of the heat dissipation member 30 from one side Z1 in the Z-axis direction.

In the present embodiment, the flexible wiring board 40i and the heat dissipation member 30 face each other. Therefore, it is preferable to prevent the short-circuit between the flexible wiring board 40i and the heat dissipation member 30 by a configuration in which the flexible wiring board 40i is curved on the opposite side of the heat dissipation member 30 or by disposing an insulation material such as a coating layer between the flexible wiring board 40i and the heat dissipation member 30.

Modification Example of Embodiment 4

In the electro-optical module 10 described in Embodiment 4, a configuration may be adopted, in which the light shielding layer 569 for forming a border is formed on the surface of the electro-optical panel 40 side of the first transparent plate 56, and the plate-shaped light shielding portion 67 is not provided on the first transparent plate 56 side as described in the modification example 1 of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Embodiment 5

FIG. 14A and FIG. 14B are cross-sectional views of an electro-optical module 10 in Embodiment 5 of the invention. FIG. 14A is a YZ cross-sectional view of the electro-optical module and FIG. 14B is an XZ cross-sectional view of the same. Since the basic configuration in the modification example is similar to that in Embodiment 1, the common portions will be referred to by the same signs, and the description thereof will be omitted.

As illustrated in FIG. 14A and FIG. 14B, in the electro-optical module 10 in the present embodiment also, similarly to Embodiment 1, each of corner portions 610, 620, 630, and 640 of the frame 60 faces the protrusion surface 55 protruding from the first transparent plate 56 of the first substrate 51 and the side surfaces 561, 562, 563, and 564 of the first transparent plate 56, and the adhesive P is interposed therebetween.

In addition, in the present embodiment, similarly to Embodiment 3, the rectangular frame-shaped heat dissipation member 30 is disposed inside of the frame 60, and the heat dissipation member 30 includes the wall portion 31 that is positioned between the electro-optical panel 40 and the wall portion 61 of the frame 60, the wall portion 32 that is positioned between the electro-optical panel 40 and the wall portion 62 of the frame 60, and the wall portion 33 that is positioned between the electro-optical panel 40 and the wall portion 63 of the frame 60. Here, similarly to Embodiment 2, the second transparent plate 57 has a larger size than the second substrate 52 and has a rectangular shape in a plan view, and on the surface of the second substrate 52 side of the second transparent plate 57, a protrusion surface 570 protruding from the second substrate 52 is formed so as to surround the entire circumference of the second substrate 52. In addition, on the surface of the second substrate 52 side of the second transparent plate 57, the light shielding layer 579 is continuously and integrally formed on the area overlapping the second substrate 52 without overlapping the image display area 40a in a plan view and on the protrusion surface 570.

In correspondence to such a configuration, in the wall portions 61, 62, and 63 of the frame 60, the side surfaces 571, 572, and 573 of the second transparent plate 57 and the internal corner-shaped corner portions 618, 628, and 638 bent along the protrusion surface 570 protruding from the second substrate 52 of the second transparent plate 57 are formed. For this reason, the frame 60 faces the side surfaces 571, 572, and 573 of the second transparent plate 57 and the light shielding layer 579 formed on the protrusion surface 570 protruding from the second substrate 52 of the second transparent plate 57 by the corner portions 618, 628, and 638. In addition, the adhesive P is interposed between the frame 60 and the side surfaces 571, 572, 573, and 574 of the second transparent plate 57, and between the frame 60 and the light shielding layer 579 formed on the protrusion surface 570 of the second transparent plate 57, but the air layer is not interposed. In addition, the heat dissipation member 30 also faces the light shielding layer 579 formed on the protrusion surface 570 of the second transparent plate 57, and the adhesive P is interposed between the heat dissipation member 30 and the light shielding layer 579, but the air layer is not interposed. For this reason, it is possible to release the heat of the electro-optical panel 40 to the heat dissipation member 30 and the frame 60 via the light shielding layer 579.

In addition, on the inner surface side of the wall portions 31, 32, and 33, a step portion bent along the outer shape of the electro-optical panel 40 is formed. For this reason, the inner side surface of the wall portions 31, 32, and 33 faces the side surfaces 511, 512, and 513 of the first substrate 51, the protrusion surface of the first surface 51a of the first substrate 51 protruding from the second substrate 52, and the side surfaces 521, 522, and 523 of the second substrate 52. In addition, the end portion on the other side Z2 of the wall portions 31, 32, and 33 in the Z-axis direction faces near the corner portions 610, 620, and 630 of the frame 60, and the end portion on the one side Z1 in the Z-axis direction faces the protrusion surface 570 protruding from the second substrate 52 of the second transparent plate 57. The adhesive P is interposed between the wall portions 31, 32, 33, the frame 60, and the electro-optical panel 40 and the second transparent plate 57.

However, on the one side Y1 in the Y-axis direction, the first substrate 51 of the electro-optical panel 40 largely protrudes. For this reason, a portion of the heat dissipation member 30 which is positioned on the one side Y1 in the Y-axis direction becomes the wall portion 34 that faces the second substrate 52 of the electro-optical panel 40 on the one side Y1 in the Y-axis direction. In the wall portion 34, an end surface on the one side Z1 in the Z-axis direction faces the protrusion surface 570 protruding from the second substrate 52 of the second transparent plate 57 and an end surface on the other side Z2 in the Z-axis direction faces the protrusion portion 515 of the first substrate 51. In addition, the adhesive P is interposed between the wall portion 34, the second substrate 52, and the protrusion surface 570 protruding from the second substrate 52 of the second transparent plate 57.

According to the configuration, the present embodiment provides substantially the same effect as that in Embodiment 1, and since the heat dissipation member 30 is interposed between the first substrate 51, the second substrate 52 and the second transparent plate 57 and the frame 60, it is possible to release the heat of the electro-optical panel 40 to the frame 60 via the heat dissipation member 30 with a high efficiency compared to the case where only the adhesive P is interposed therebetween. In addition, since the flexible wiring board 40i extends on the one side Y1 in the Y-axis direction, the frame 60 does not exist on the one side Z1 in the Z axis-direction with respect to the protrusion portion 515 or in the vicinity of the second substrate 52 or the second transparent plate 57. However, in the present embodiment, since the wall portion 34 of the heat dissipation member 30 is disposed, it is possible to release the heat of the electro-optical panel 40 to the frame 60 via the wall portion 34.

Modification Example 1 of Embodiment 5

In the electro-optical module 10 described in Embodiment 5 above, a configuration may be adopted, in which the light shielding layer 569 for forming a border is formed on the surface of the electro-optical panel 40 side of the first transparent plate 56, and the plate-shaped light shielding portion 67 is not provided on the first transparent plate 56 side as described in the modification example of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Modification Example 2 of Embodiment 5

In the electro-optical module 10 described in Embodiment 5 and Modification example 1 of Embodiment 5 above, a configuration may be adopted, in which the light shielding layer 579 for forming a border is formed on the surface of the electro-optical panel 40 side of the second transparent plate 57, and the light shielding plate 80 is not provided on the second transparent plate 57 side as described in the Modification example 1 of Embodiment 2. According to the configuration, on the one side Z1 of the second transparent plate 57 in the Z-axis direction, there is no step difference caused by the light shielding plate 80. Accordingly, the cooling air smoothly flows from the other side Y2 in the Y-axis direction to the one side Y1.

Embodiment 6

Figure 15A:
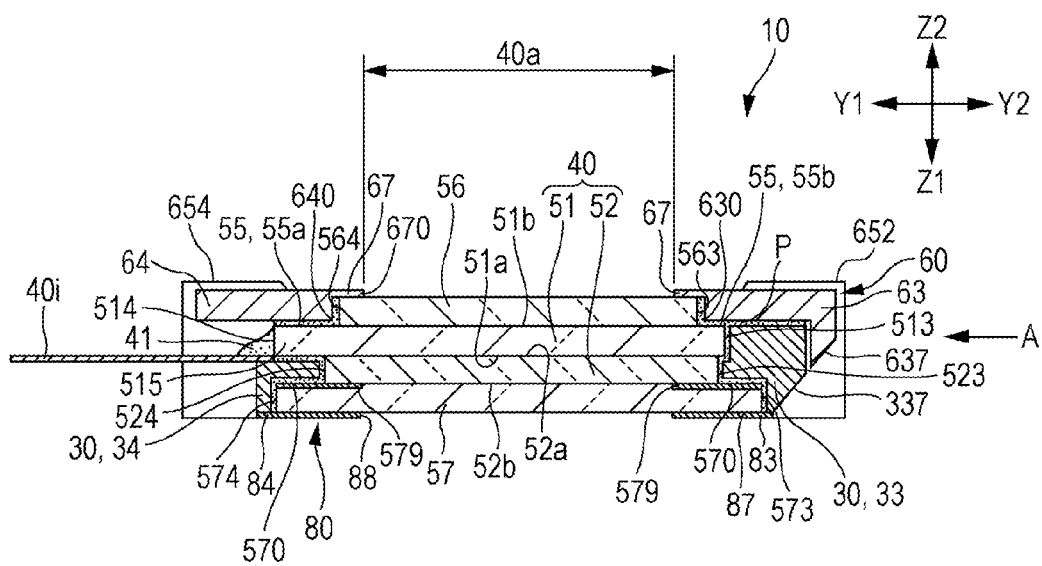
FIG. 15A and FIG. 15B are cross-sectional views of an electro-optical module in Embodiment 6 of the invention.
Figure 15B:
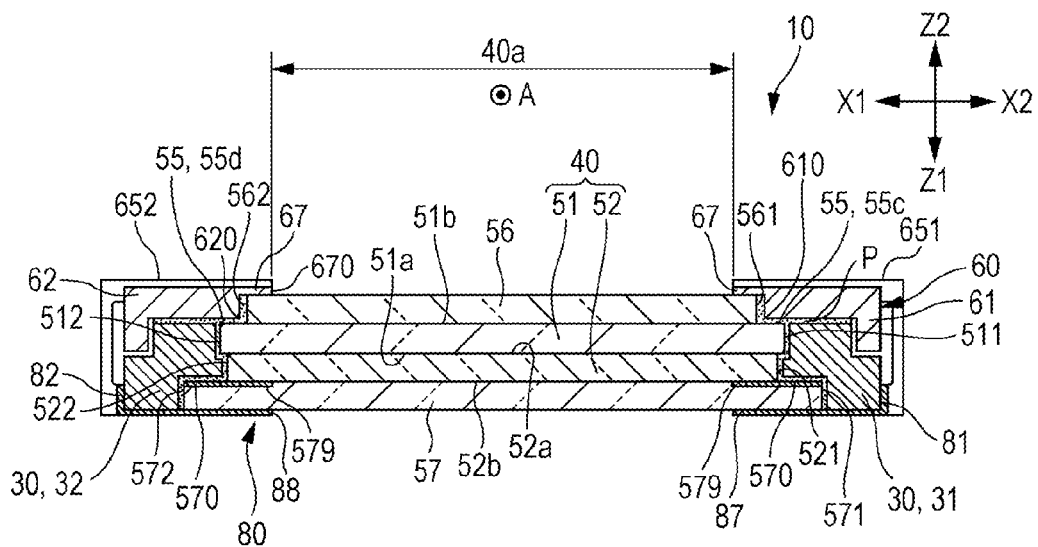

FIG. 15A and FIG. 15B are cross-sectional views of an electro-optical module 10 in an embodiment 6 of the invention. FIG. 15A is a YZ cross-sectional view of the electro-optical module and FIG. 15B is an XZ cross-sectional view of the same. Since the basic configuration in the modification example is similar to that in the embodiment 1, the common portions will be referenced by the same signs, and the description thereof will be omitted.

As illustrated in FIG. 15A and FIG. 15B, in the electro-optical module 10 in the present embodiment also, similarly to the embodiment 1, each of the corner portions 610, 620, 630, and 640 of the frame 60 faces the protrusion surface 55 protruding from the first transparent plate 56 of the first substrate 51 and the side surfaces 561, 562, 563, and 564 of the first transparent plate 56, and the adhesive P is interposed therebetween.

In addition, in the present embodiment, similarly to Embodiment 4, the rectangular frame-shaped heat dissipation member 30 overlapping on the one side Z1 in the Z direction with respect to the frame 60 is disposed inside of the frame 60. The heat dissipation member 30 includes the wall portion 31 that overlaps the wall portion 61 between the electro-optical panel 40 and the wall portion 61 of the frame 60, the wall portion 32 that overlaps the wall portion 62 between the electro-optical panel 40 and the wall portion 62 of the frame 60, and the wall portion 33 that overlaps the wall portion 63 between the electro-optical panel 40 and the wall portion 63 of the frame 60. Here, similarly to Embodiment 2, the second transparent plate 57 has a larger size than the second substrate 52 and has a rectangular shape in a plan view, and on the surface of the second substrate 52 side of the second transparent plate 57, a protrusion surface 570 protruding from the second substrate 52 is formed so as to surround the entire circumference of the second substrate 52. In addition, on the surface of the second substrate 52 side of the second transparent plate 57, the light shielding layer 579 is continuously and integrally formed on the area overlapping the second substrate 52 without overlapping the image display area 40a in a plan view and on the protrusion surface 570.

In correspondence to such a configuration, wall portions 31, 32, and 33 have a multi-stage shape bent along the outer shape of the electro-optical panel 40 and the second transparent plate 57. For this reason, the inner side surfaces of the wall portions 31, 32, and 33 face the side surfaces 511, 512, and 513 of the first substrate 51, the protrusion surface protruding from the second substrate 52 of the first surface 51a of the first substrate 51, the side surfaces 521, 522, and 523 of the second substrate 52, the protrusion surface protruding from the second transparent plate 57 of the second surface 52b of the second substrate 52, the protrusion surface 570 protruding from the second substrate 52 of the second transparent plate 57 (the light shielding layer 579), and the side surfaces 571, 572, and 573 of the second transparent plate 57. The adhesive P is interposed between the wall portions 31, 32, and 33, and the frame 60, and the electro-optical panel 40 and the second transparent plate 57.

However, since the first substrate 51 of the electro-optical panel 40 largely protrudes in one side Y1 in the Y-axis direction, a portion of the heat dissipation member 30 positioned on the one side Y1 in the Y-axis direction, faces the side surface 524 of the second substrate 52, the protrusion surface 570 protruding from the second substrate 52 of the second transparent plate 57, and the side surface 574 of the second transparent plate 57. The adhesive P is interposed between the wall portion 34 and the frame 60, the second substrate 52 and the second transparent plate 57.

According to the configuration, the present embodiment provides substantially the same effect as that in Embodiment 1, and since the heat dissipation member 30 is disposed around the first substrate 51, the second substrate 52 and the second transparent plate 57, it is possible to release the heat of the electro-optical panel 40 to the heat dissipation member 30 with a high efficiency. Particularly, the heat dissipation member 30 also faces the light shielding layer 579 formed on the protrusion surface 570 of the second transparent plate 57, and the adhesive P is interposed between the heat dissipation member 30 and the light shielding layer 579, but the air layer is not interposed. For this reason, it is possible to release the heat of the electro-optical panel 40 to the heat dissipation member 30 via the light shielding layer 579. In addition, since the flexible wiring board 40i extends on the one side Y1 in the Y-axis direction, the frame 60 does not exist on the one side Z1 in the Z axis-direction with respect to the protrusion portion 515 or in the vicinity of the second substrate 52 or the second transparent plate 57. However, in the present embodiment, since the wall portion 34 of the heat dissipation member 30 is disposed, it is possible to release the heat of the electro-optical panel 40 to the frame 60 via the wall portion 34.

In the process of manufacturing the electro-optical module 10 in such a configuration, the heat dissipation member 30 can be used as the member for position determination of the second transparent plate 57. Specifically, when the second transparent plate 57 is adhered to the electro-optical panel 40, the electro-optical panel 40 is disposed inside of the heat dissipation member 30, then, the second transparent plate 57 and the second surface 52b of the second substrate 52 are bonded while overlapping the second transparent plate 57 on the second surface 52b of the second substrate 52 via the opening portion of the heat dissipation member 30 from one side Z1 in the Z-axis direction. At this time, if the adhesive P is applied inside of the heat dissipation member 30 in advance, it is possible to adhere and fix the electro-optical panel 40 or the second transparent plate 57 to the heat dissipation member 30.

Therefore, after applying the adhesive P in the vicinity of or on the inner surface of the corner portions 610, 620, 630, and 640 of the frame 60, the electro-optical panel 40 to which the first transparent plate 56 is adhered and the heat dissipation member 30 are accommodated in the inner side of the frame 60, the first transparent plate 56, the electro-optical panel 40, the second transparent plate 57, and the heat dissipation member 30 are accommodated inside of the frame 60, the light shielding plate 80 is coupled to the frame 60, and then, if the adhesive P is cured, the assembling of the electro-optical module 10 is completed.

Modification Example 1 of Embodiment 6

In the electro-optical module 10 described in Embodiment 6, a configuration may be adopted, in which the light shielding layer 569 for forming a border is formed on the surface of the electro-optical panel 40 side of the first transparent plate 56, and the plate-shaped light shielding portion 67 is not provided on the first transparent plate 56 side as described in the modification example of Embodiment 1. According to the configuration, on the other side Z2 of the first transparent plate 56 in the Z-axis direction, there is no step difference caused by the plate-shaped light shielding portion 67. Accordingly, the cooling air smoothly flows from the other side Y2 in the Y-axis direction to the one side Y1.

Modification Example 2 of Embodiment 6

In the electro-optical module 10 described in Embodiment 6 and the modification example 1 of Embodiment 6 above, a configuration may be adopted, in which the light shielding layer 579 for forming a border is formed on the surface of the electro-optical panel 40 side of the second transparent plate 57, and the light shielding plate 80 is not provided on the second transparent plate 57 side as described in the modification example 1 of Embodiment 2. According to the configuration, on the one side Z1 of the second transparent plate 57 in the Z-axis direction, there is no step difference caused by the light shielding plate 80. Accordingly, the cooling air smoothly flows from the other side Y2 in the Y-axis direction to the one side Y1.

Other Embodiments

In the embodiments described above, the relationships between the width of the protrusion surface 55 protruding from the first transparent plate 56 of the first substrate 51 and the overlapping area of the protrusion surface 55 and the frame 60 is: the third protrusion surfaces 55c and 55d≅the second protrusion surface 55b<the first protrusion surface 55a. However, it is preferable that the relationships be: the third protrusion surfaces 55c and 55d<the second protrusion surface 55b<the first protrusion surface 55a.

In a case where the cooling air is supplied to the electro-optical module 10, since a side opposite to the side where the protrusion portion 51b to which the flexible wiring board 40i is connected is positioned becomes the windward side, if the overlapping width of the protrusion surface 55 of the first substrate 51 and the frame 60 in the windward side increases, the efficiency of the heat dissipation increases. Therefore, even if the overlapping width of the third protrusion surfaces 55c and 55d positioned between the first protrusion surface 55a and the second protrusion surface 55b and the frame 60 decreases, it is possible to assure sufficient heat dissipation in view of the whole electro-optical module 10. Therefore, it is possible to decrease the width of the electro-optical module 10 by as much as the decreased overlapping width of the third protrusion surfaces 55c and 55d and the frame 60.

In addition, in any embodiments described above, by providing a rib on the surface of the other side Z2 of the wall portions 61, 62, 63, and 64 of the frame 60 in the Z-axis direction, which extends in the Y-axis direction (the cooling air flowing direction), the surface area of the frame 60 may be expanded and thus, the heat dissipation of the frame 60 may be increased.

In the embodiments described above, the electro-optical module 10 that includes the transmission-type electro-optical panel 40 is exemplified. However, the invention may be applied to an electro-optical module 10 that includes the reflection-type electro-optical panel 40.

In the embodiments described above, a front projection-type display apparatus that performs the projection from the direction of observing the projected image is exemplified as the projection-type display apparatus. However, the invention may be applied to a projection-type display apparatus used in a rear projection-type display apparatus that performs projection from the opposite side to the direction of observing the projected image.

In the embodiments described above, the liquid crystal panel is exemplified as the electro-optical panel for describing. However, the invention is not limited thereto, and may be applied to an electro-optical module that uses an organic electroluminescent display panel, a plasma display panel, a field emission display (FED) panel, a surface-conduction electron-emitter display (SED) panel, a light emitting diode (LED) display panel, and an electrophoretic display panel.

The electro-optical module to which the invention is applied may be used as a direct view-type display device in an electronic apparatus such as a head-mounted-type display, a mobile phone, a personal digital assistance (PDA), a digital camera, an LCD television set, a car navigation device, a video phone, a POS terminal, and an apparatus that includes a touch panel, in addition to the electronic apparatus (projection-type display apparatus) described above.

This application claims priority to Japan Patent Application No. 2013-247380 filed Nov. 29, 2013, the entire disclosures of which are hereby incorporated by reference in their entireties.

What is claimed is:

1. An electro-optical module comprising:
   an electro-optical panel that includes a first substrate, a second substrate which is disposed so as to face the first substrate and an electro-optical material layer which is provided between the first substrate and second substrate,
   a first transparent plate that overlaps at least an image display area of the electro-optical panel on a side of the first substrate on an opposite side to the second substrate,
   a second transparent plate that overlaps the image display area on a surface of the second substrate on an opposite side to the first substrate, and
   a frame that includes a corner portion bent along a protrusion surface protruding from a side surface of the first transparent plate and the first transparent plate of the first substrate, and that accommodates the first transparent plate and the electro-optical panel,
   wherein the first substrate includes a protrusion portion which protrudes from an end portion of the second substrate and to which a flexible wiring board is connected,
   wherein, among protrusion surfaces of the first substrate, an overlapping width of a first protrusion surface on a protrusion portion side that overlaps with the frame is larger than an overlapping width of a second protrusion surface that overlaps with the frame, the second protrusion surface being positioned on a side opposite to the first protrusion surface across the first transparent plate, and wherein the overlapping width of the second protrusion surface that overlaps with the frame is larger than an overlapping width of a third protrusion surface that overlaps with the frame, the third protrusion surface being positioned between the first protrusion surface and the second protrusion surface.

2. The electro-optical module according to claim 1, wherein a size of the first transparent plate is smaller than that of the first substrate, and
wherein the protrusion surface and the corner portion are formed so as to surround the entire circumference of the first transparent plate.

3. The electro-optical module according to claim 1, wherein the frame includes a plate-shaped light shielding portion for forming a border, which overlaps a surface of the first transparent plate to the opposite side of the first substrate.

4. The electro-optical module according to claim 1, wherein a light shielding layer for forming a border is provided on the surface of the first transparent plate on the electro-optical panel side, and
wherein, on a side of the first substrate where the first transparent plate is positioned, an end portion of the frame and a surface of the first transparent plate to the opposite side of the first substrate are positioned in the same plane.

5. The electro-optical module according to claim 1, wherein an adhesive is interposed between the protrusion surfaces of the first substrate and the frame.

6. The electro-optical module according to claim 1, further comprising:
a light shielding plate that is coupled to the frame and that forms a border by overlapping with a surface of the second transparent plate on a side opposite to the electro-optical panel.

7. The electro-optical module according to claim 1, wherein a light shielding layer for forming a border is provided on the surface of the second transparent plate on the electro-optical panel side, and
wherein, on a side of the second substrate where the second transparent plate is positioned, the end portion of the frame and a surface of the second transparent plate to the opposite side of the second substrate are positioned in the same plane.

8. The electro-optical module according to claim 1, wherein the first substrate is an element substrate that includes a pixel electrode and a switching element provided corresponding to the pixel electrode.

9. The electro-optical module according to claim 8, wherein the electro-optical panel is a liquid crystal panel that includes a liquid crystal layer as an electro-optical material layer.

10. A projection-type display apparatus that is an electronic apparatus including the electro-optical module according to claim 1, comprising:
a light source portion that emits light which is supplied to the electro-optical module, and
a projection optical system in which the light modulated by the electro-optical module is projected.

11. A projection-type display apparatus that is an electronic apparatus including the electro-optical module according to claim 2, comprising:
a light source portion that emits light which is supplied to the electro-optical module, and
a projection optical system in which the light modulated by the electro-optical module is projected.

12. A projection-type display apparatus that is an electronic apparatus including the electro-optical module according to claim 3, comprising:
a light source portion that emits light which is supplied to the electro-optical module, and
a projection optical system in which the light modulated by the electro-optical module is projected.

13. A projection-type display apparatus that is an electronic apparatus including the electro-optical module according to claim 4, comprising:
a light source portion that emits light which is supplied to the electro-optical module, and
a projection optical system in which the light modulated by the electro-optical module is projected.

14. A projection-type display apparatus that is an electronic apparatus including the electro-optical module according to claim 5, comprising:
a light source portion that emits light which is supplied to the electro-optical module, and
a projection optical system in which the light modulated by the electro-optical module is projected.

15. A projection-type display apparatus that is an electronic apparatus including the electro-optical module according to claim 6, comprising:
a light source portion that emits light which is supplied to the electro-optical module, and
a projection optical system in which the light modulated by the electro-optical module is projected.

16. A projection-type display apparatus that is an electronic apparatus including the electro-optical module according to claim 7, comprising:
a light source portion that emits light which is supplied to the electro-optical module, and
a projection optical system in which the light modulated by the electro-optical module is projected.

17. A projection-type display apparatus that is an electronic apparatus including the electro-optical module according to claim 8, comprising:
a light source portion that emits light which is supplied to the electro-optical module, and
a projection optical system in which the light modulated by the electro-optical module is projected.

18. A projection-type display apparatus that is an electronic apparatus including the electro-optical module according to claim 9, comprising:
a light source portion that emits light which is supplied to the electro-optical module, and
a projection optical system in which the light modulated by the electro-optical module is projected.

19. The projection-type display apparatus according to claim 10, further comprising:
a cooling device that supplies cooling air to the electro-optical module.

* * * * *